US012465052B2

(12) United States Patent
Morey et al.

(10) Patent No.: US 12,465,052 B2
(45) Date of Patent: Nov. 11, 2025

(54) SPIRAL CONVEYOR THERMAL PROCESSING SYSTEM

(71) Applicant: JBT Marel Corporation, Chicago, IL (US)

(72) Inventors: Owen Eugene Morey, Huron, OH (US); Ramesh M. Gunawardena, Solon, OH (US)

(73) Assignee: JBT Marel Corporation, Chicago, IL (US)

( * ) Notice: Subject to any disclaimer, the term of this patent is extended or adjusted under 35 U.S.C. 154(b) by 1313 days.

(21) Appl. No.: 15/418,519

(22) Filed: Jan. 27, 2017

(65) Prior Publication Data

US 2018/0213801 A1    Aug. 2, 2018

(51) Int. Cl.
A21B 1/24    (2006.01)
A21B 1/48    (2006.01)
(Continued)

(52) U.S. Cl.
CPC ............... *A21B 1/24* (2013.01); *A21B 1/48* (2013.01); *A21B 3/04* (2013.01); *A23B 2/25* (2025.01);
(Continued)

(58) Field of Classification Search
CPC .... A21B 1/24; A21B 1/48; A21B 3/04; A21B 1/26; A21B 1/40; A21B 1/42; A23L 3/06; A23L 3/16; A23L 3/02; A23L 3/04; A23L 3/065; A23L 3/18; A23L 3/40; A23L 3/045; A23L 3/165; A23L 3/185; A23L 205/13;
(Continued)

(56) References Cited

U.S. PATENT DOCUMENTS 2,093,270 A * 9/1937 Glinka .................... F25D 25/04
34/147
3,212,426 A    10/1965 Lewus
(Continued)

FOREIGN PATENT DOCUMENTS

AU    2012225317 A1    9/2013
CA    2 711 889 A1    7/2009
(Continued)

OTHER PUBLICATIONS

Fans NPL, published Feb. 3, 2016, https://web.archive.org/web/20160203063608/https://removeandreplace.com/2013/10/24/ceiling-fan-direction-winter-summer/ (Year: 2016).*
(Continued)

*Primary Examiner* — Erik Kashnikow
*Assistant Examiner* — Bryan Kim
(74) *Attorney, Agent, or Firm* — Christensen O'Connor Johnson Kindness PLLC

(57) ABSTRACT

The conveyor belt (24) of an oven system and apparatus (20) is configured into ascending and descending spiral stacks (26) and (28) to define a central cylindrical channel (62). A pair of upper and lower fans (130) and (132) are positioned within the central channel (62) to circulate thermal processing fluid in upper and lower circuits vertically through the spiral stacks and also laterally toward the inlet of the fans (130) and (132) to set up upper and lower thermal processing zones in the spiral stacks and circulation routes for the cooking medium through the spiral stacks.

19 Claims, 7 Drawing Sheets

(51) Int. Cl.
*A21B 3/04* (2006.01)
*A23B 2/25* (2025.01)
*A23B 2/40* (2025.01)
*F28D 1/047* (2006.01)
*B65G 15/54* (2006.01)

(52) U.S. Cl.
CPC .............. *A23B 2/40* (2025.01); *F28D 1/047* (2013.01); *A23V 2002/00* (2013.01); *B65G 15/54* (2013.01)

(58) Field of Classification Search
CPC ... A23L 205/15; A23V 2002/00; B65G 15/54; F28D 1/047; F26B 3/02; F26B 3/04; F26B 15/04; F26B 15/06; F26B 15/26; F26B 21/12
See application file for complete search history.

(56) References Cited

U.S. PATENT DOCUMENTS

| | | | |
|---|---|---|---|
| 3,653,490 A | 4/1972 | DePietro et al. | |
| 3,873,755 A | 3/1975 | McKay | |
| 3,938,651 A | 2/1976 | Alfred et al. | |
| 4,627,530 A | 12/1986 | Franke | |
| 4,737,373 A | 4/1988 | Forney | |
| 4,953,365 A | 9/1990 | Lang et al. | |
| 5,040,974 A * | 8/1991 | Lanham ............... | A21B 1/26 432/121 |
| 5,065,860 A | 11/1991 | Faulkner | |
| 5,078,120 A | 1/1992 | Hwang | |
| 5,205,135 A | 4/1993 | Lang | |
| 5,243,962 A | 9/1993 | Hwang | |
| 5,335,590 A | 8/1994 | Crump, III et al. | |
| 5,398,521 A * | 3/1995 | Baron ............... | B65G 21/18 62/381 |
| 5,609,095 A | 3/1997 | Lemke et al. | |
| 5,803,232 A | 9/1998 | Fröderberg | |
| 6,138,660 A | 10/2000 | Middleton, Jr. | |
| 6,146,678 A | 11/2000 | Caridis et al. | |
| 6,334,330 B2 * | 1/2002 | Lang ............... | F25D 3/11 62/380 |
| 6,410,066 B1 | 6/2002 | Weng | |
| 6,418,834 B1 * | 7/2002 | Perrine ............... | A23B 2/30 99/360 |
| 6,619,069 B1 * | 9/2003 | Persson ............... | B65G 17/064 62/380 |
| 6,912,869 B2 * | 7/2005 | Lang ............... | A21B 1/245 62/380 |
| 7,107,899 B2 * | 9/2006 | Nothum, Jr. ............... | A21B 1/42 99/386 |
| 8,567,308 B2 * | 10/2013 | Onozato ............... | F25D 13/067 99/477 |
| 8,753,703 B2 | 6/2014 | Gunawardena et al. | |
| 8,807,021 B2 | 8/2014 | McVeagh et al. | |
| 9,107,422 B2 | 8/2015 | Howard et al. | |
| 9,220,276 B2 | 12/2015 | Howard | |
| 9,504,258 B1 | 11/2016 | Howard et al. | |
| 9,510,610 B2 | 12/2016 | Howard | |
| 2002/0029698 A1 | 3/2002 | van de Vorst et al. | |
| 2004/0022909 A1 | 2/2004 | Holm et al. | |
| 2004/0057867 A1 * | 3/2004 | Pijls ............... | A61L 2/04 422/26 |
| 2007/0023413 A1 | 2/2007 | Wilson | |
| 2007/0131215 A1 | 6/2007 | McVeagh et al. | |
| 2007/0267018 A1 * | 11/2007 | Paller ............... | F24C 15/322 128/204.23 |
| 2009/0181138 A1 | 7/2009 | Howard | |
| 2012/0040062 A1 | 2/2012 | Srsen et al. | |
| 2013/0133637 A1 * | 5/2013 | McVeagh ............... | F24C 15/001 126/15 R |
| 2013/0220145 A1 * | 8/2013 | Ros ............... | A21B 1/48 99/443 C |
| 2015/0010679 A1 | 1/2015 | Strong et al. | |
| 2015/0250213 A1 | 9/2015 | Howard | |
| 2016/0324194 A1 * | 11/2016 | Ohrlander ............... | A23L 3/001 |
| 2017/0001812 A1 | 1/2017 | Howard et al. | |
| 2017/0016624 A1 | 1/2017 | McVeagh et al. | |

FOREIGN PATENT DOCUMENTS

| | | | | |
|---|---|---|---|---|
| EP | 1 797 758 A2 | 6/2007 | | |
| EP | 2 230 922 B1 | 12/2012 | | |
| EP | 2 672 829 A1 | 12/2013 | | |
| EP | 2 740 361 A2 | 6/2014 | | |
| GB | 101941 A * | 11/1916 | ............. | F26B 15/26 |
| GB | 1038955 A | 8/1966 | | |
| JP | 2000-296167 A | 10/2000 | | |
| WO | 84/01266 A1 | 4/1984 | | |
| WO | 2006/049492 A1 | 5/2006 | | |
| WO | 2012/122491 A1 | 9/2012 | | |
| WO | 2012/166962 A2 | 12/2012 | | |
| WO | 2013/112052 A1 | 8/2013 | | |

OTHER PUBLICATIONS

International Search Report and Written Opinion mailed May 14, 2018, issued in corresponding International Application No. PCT/US2018/014964, filed Jan. 24, 2018, 13 pages.

International Preliminary Report on Patentability mailed May 16, 2019, issued in corresponding International Application No. PCT/US2018/014964, filed Jan. 24, 2018, 22 pages.

Written Opinion mailed Apr. 5, 2019, issued in corresponding International Application No. PCT/US2018/014964, filed Jan. 24, 2018, 8 pages.

* cited by examiner

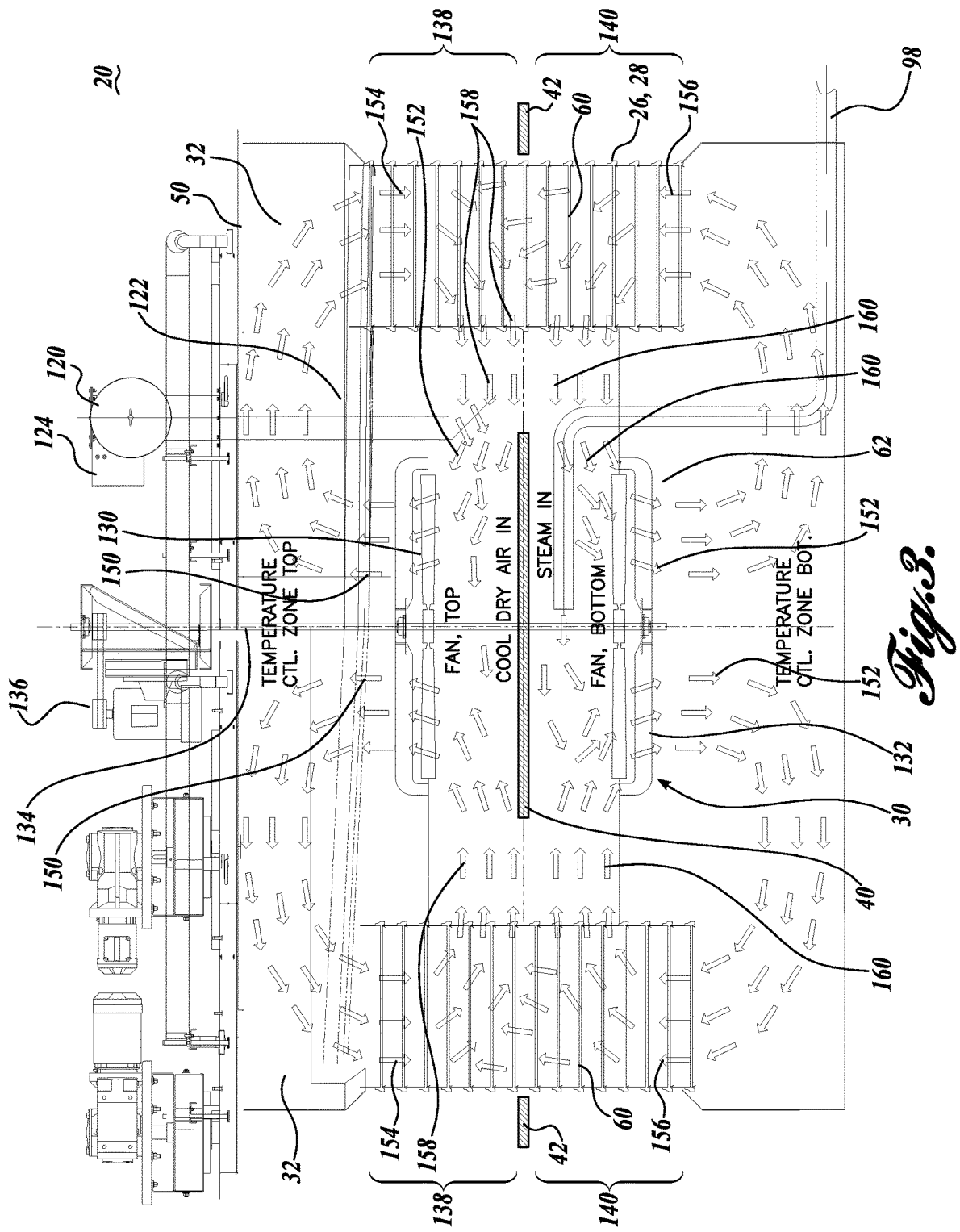

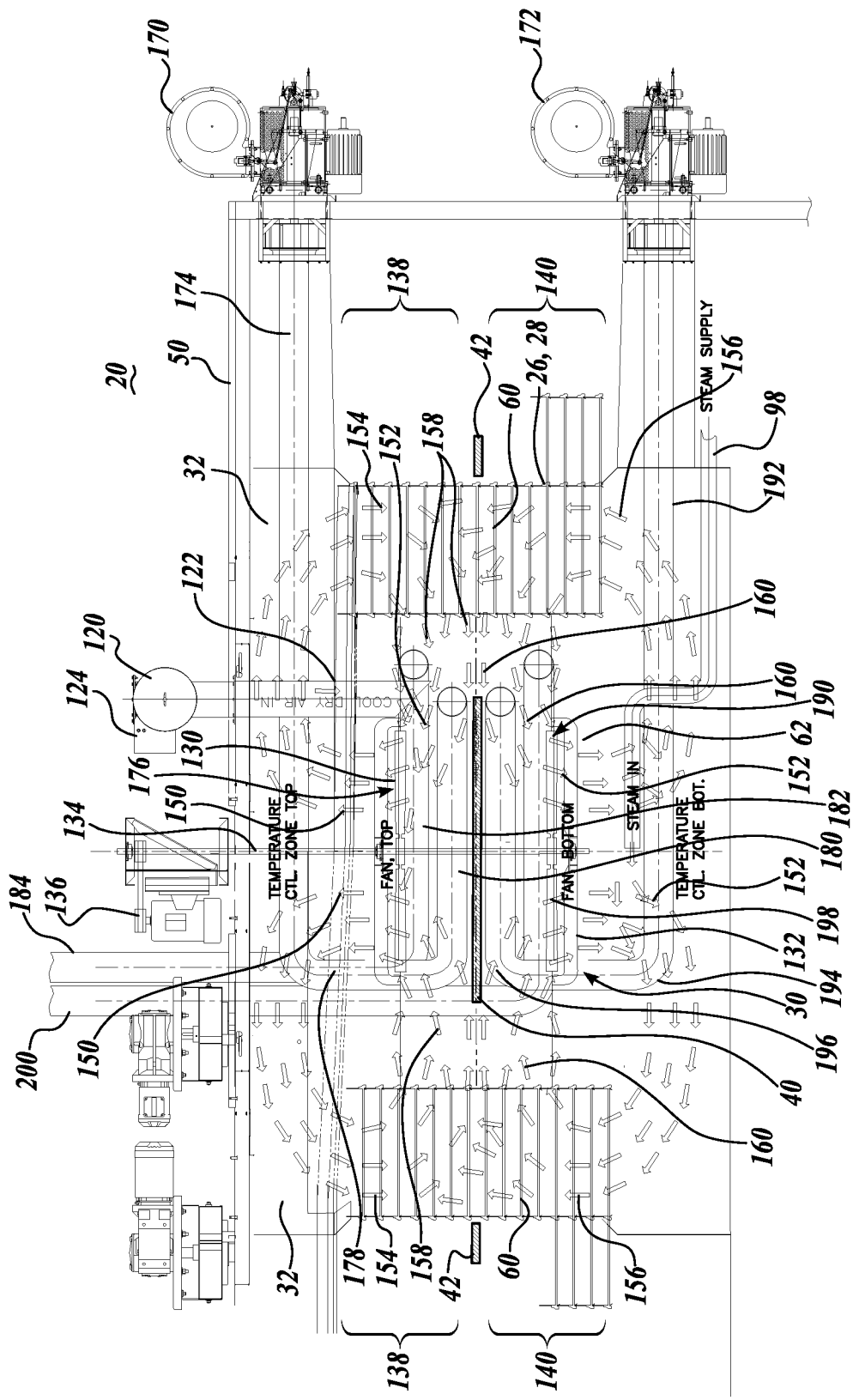

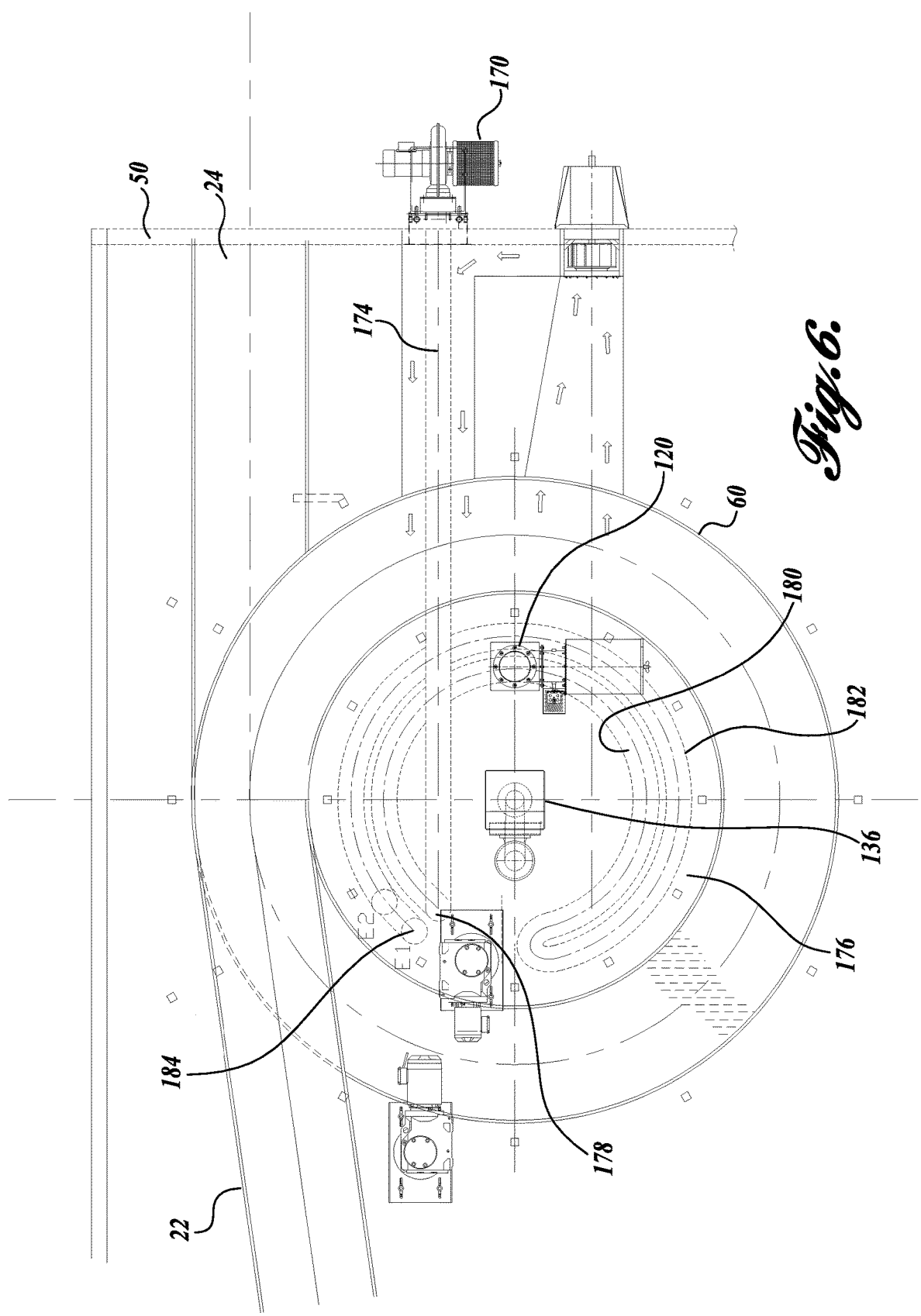

SPIRAL CONVEYOR THERMAL PROCESSING SYSTEM

BACKGROUND

Spiral conveyor-based thermal processing systems include a cooking surface or a cooling/freezing surface in the form of a pervious conveyor belt for conveying workpieces, including food, through a thermal processing chamber in a spiral or helical path. If the workpiece is being cooked or otherwise heated, a heat source, such as steam, air, or mixtures thereof, is provided within or adjacent the cooking chamber for cooking the workpieces. Correspondingly, if thermal processing is in the form of cooling or freezing, then a source of cooling medium is provided either within the cooling/freezing chamber or adjacent thereto.

An advantage of thermal processing systems utilizing spiral conveyor belts is that a relatively long processing path can be achieved with a small footprint. For example, a 600-foot-long thermal processing conveyor belt in a spiral configuration can be contained within a 20-foot×20-foot×20-foot housing. However, spiral stack conveyor thermal processing systems do have inherent drawbacks from a linear oven of a comparable length. In a linear oven, the upper and lower surfaces of the products are exposed to being efficiently impinged upon by the thermal processing medium. However, in a spiral oven, the workpiece is not as directly accessible to the thermal processing medium since the work products are arranged in stacked layers, thus requiring less direct thermal processing methods than direct impingement of the thermal processing medium onto the food product.

In one spiral stack conveyor, a fan system is used to direct the flow of the thermal processing medium in the form of 100% steam or air or a mixture of steam and air vertically through the annulus of the spiral conveyor, either in the upward or downward direction, as well as to some extent horizontally across the layers of the spiral stack. One difficulty in this type of thermal processing medium flow arrangement is to achieve uniform thermal processing across the conveyor since typically the food product is arranged in multiple lanes with variable spacing along the conveyor. When the conveyor belt is in straight configuration, the food products can be fairly uniformly spaced across and along the conveyor. However, when the conveyor curves into a spiral, the food products on the inside of the conveyor become relatively closer together, whereas the food products on the outside of the conveyor become relatively further apart. As such, the food products on the inside of the conveyor tend to receive less thermal processing medium per food product relative to the food products located on the outside of the conveyor. As such, attempts have been made to direct at least some of the thermal processing medium across the levels or flights or tiers of the conveyor, typically from the outside toward the center of the spiral.

Other techniques that have been employed in an effort to more uniformly thermally treat food products in a spiral stack conveyor include reversing the direction of flow of the thermal treatment medium while the food product is moving along the spiral conveyor. For example, during part of the processing cycle, the thermal processing medium may be directed upwardly through the annulus of the spiral, and then later in the cooking process, the direction of flow of the thermal processing medium may be reversed to flow from the top of the conveyor stack down.

Another effort in achieving more uniform thermal processing is to employ baffles or mezzanines around and/or within the center of the spiral conveyor to control the direction of the thermal processing medium flow through the spiral stack. In this regard, fixed inner mezzanines have been positioned with the center of the spiral stack to essentially divide the spiral stack into two different thermal processing zones. For example, a first thermal processing zone may be at a higher pressure, and a second thermal processing zone may be at a lower pressure. The heat transfer between the thermal processing medium and the workpiece primarily occurs either by condensation heat transfer or convection heat transfer. In a cooking situation, condensation heat transfer is more efficient when the surface temperature of the workpiece is below the dew point temperature of the cooking medium, for example, steam or a steam-air mixture. Convection heat transfer is typically used to finish when the temperature of the workpiece rises above the dew point temperature and also to develop color and to brown the workpiece.

A further effort to achieve more uniform and effective thermal treatment of food products is to employ tubes or nozzles that extend laterally between layers or tiers of the spiral stack, and thereby direct the thermal processing medium downwardly or upwardly toward the food product being carried on the spiral conveyor. This is an attempt to incorporate an impingement type system into a spiral stack thermal processing apparatus. Of course, this system requires a more complicated structure, which structure must be maintained in sanitary conditions, and thus requires periodic cleaning. The cleaning process is time consuming, thereby reducing the potential operating time of the thermal processing system.

The present disclosure seeks to provide a system and method for thermally processing work products, including food products, while being transported on a conveyor disposed into a spiral stack in an efficient manner to achieve substantially uniform processing of all of the food products being carried on the spiral stack conveyor.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A circulation system is provided for circulating thermal processing medium through a spiral stack conveyor positionable in a thermal processing chamber. The spiral stack conveyor defines a central channel within which is positioned a pair of vertically spaced-apart circulation fans. The circulation fans direct the flow of thermal processing medium relative to the spiral stack. The circulation fans move the thermal processing medium in opposite directions up the center channel as well as down the center channel, to elevations above and below the conveyor stack. Thereafter the fans and thermal chamber configuration cause the thermal processing fluid to enter downwardly into an upper zone or segment of the stack and enter upwardly into a lower zone or segment of the stack to circulate the thermal processing fluid through the stack. When the thermal processing fluid from the top zone or segment and the bottom zone or segment of the stack meet each other, the thermal processing fluid is then directed laterally inwardly through the stack to the center of the cylindrical channel coinciding with the inlet of the upper and lower fans, to complete the flow circuits through the spiral stack. In this regard, an upper circulation pattern flowing through the upper zone or segment of the stack and a lower circulation pattern flowing through the lower zone or segment of the stack are established by the two fans. Moreover, during travel of the work product through the spiral stack, flow of the thermal processing fluid is imparted to the work product from below as well as above.

The fans direct the thermal processing medium in opposite directions relative to each other through the central channel. In this regard, the distance separating the fans can be varied and the elevation of the fans relative to the spiral stack can be adjusted thereby to change the size of the upper and lower stack zones or segments relative to each other.

The circulation fans can be in the form of propellers or other types of fans. If the fans are in the form of propellers, the propellers have opposite pitches so as to move the thermal processing fluid in opposite directions.

The propellers can be coupled together so as to be rotatable in unison. In addition, the propellers can be coupled to a common drive system. Alternatively the fans can be individually driven and/or individually supported.

A mezzanine can be disposed between the two fans so as to assist in separating the flow patterns of the two fans in the upper and lower zones or segments of the stack. Mezzanines can also be used outside of the spiral conveyor stack to help control the flow of thermal processing fluid relative to the stack, The circulation system can be part of a thermal processing apparatus. In addition to the spiral stack conveyor and the circulation system for the thermal processing medium, the apparatus can include a thermal processing chamber having an inlet and an outlet through which the conveyor enters and exits the chamber. Also, a thermal processing medium supply for supplying thermal processing fluid can be incorporated into the apparatus.

Further, the spiral conveyor can be configured into at least two spiral stacks within the thermal processing chamber. In this situation, a pair of spaced-apart circulation fans can be disposed within the central channel of both of the spiral stacks. As an alternate configuration with two stacks, the two spiral stacks can be arranged such that the second stack can have a single propeller fan that is moving the convection medium in a single zone direction.

The thermal processing medium supply of the thermal processing apparatus may supply saturated steam and/or heated air to the thermal processing chamber. The heated air can be supplied to the apparatus at the intake locations of the fans so as to mix the heated air with the circulating thermal processing fluid before entering the top and bottom zones or segments of the spiral stacks.

As a further aspect of the present invention, the thermal processing medium supply can consist of one or more heat exchangers positioned within the central channel of one or both of the spiral stacks.

A method for thermally processing work products includes conveying the work products in a spiral path in a thermal processing chamber. The spiral path defines the central channel extending centrally along the spiral path. Thermal processing medium is supplied to the thermal processing chamber. The thermal processing medium is forced in opposite directions along the length of the central channel, thereby causing the thermal processing fluid to flow in two circulation paths through upper and lower zones/segments of the spiral stack along the length of the spiral stack and also laterally across the spiral stack relative to the central channel.

In a further aspect of the method, the thermal processing medium is routed upwardly and downwardly through the central channel and then downwardly and upwardly respectively through the spiral stack to an intermediate elevation of the spiral stack. At such intermediate location the thermal processing medium flows laterally towards the central channel.

In an alternative flow arrangement, the thermal processing medium is circulated radially laterally outwardly through the spiral stacks at an elevation intermediate the height of the spiral stack. Once within the spiral stack, the thermal processing medium flows in opposite directions upwardly and downwardly through upper and lower zones/segments of the spiral stack to exit the upper and lower ends of the spiral stack. Thereafter the thermal processing medium flows downwardly and upwardly respectively through the central channel to an elevation at which the thermal processing fluid merges and then again flows laterally radially outwardly from the central channel radially outwardly into the spiral stack.

In another aspect of the present method, heat is applied to the thermal processing medium at least one location within the central channel.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 is an enlarged elevational view of a portion of FIG. 1 showing the flow pattern of the thermal processing medium through the thermal processing system of FIG. 1;

FIG. 5 is a view similar to FIG. 3 but showing a high temperature heat source utilized in conjunction with the thermal processing system of the present disclosure; and FIG. 6 is a top schematic view of FIG. 5.

DETAILED DESCRIPTION

Figure 1:
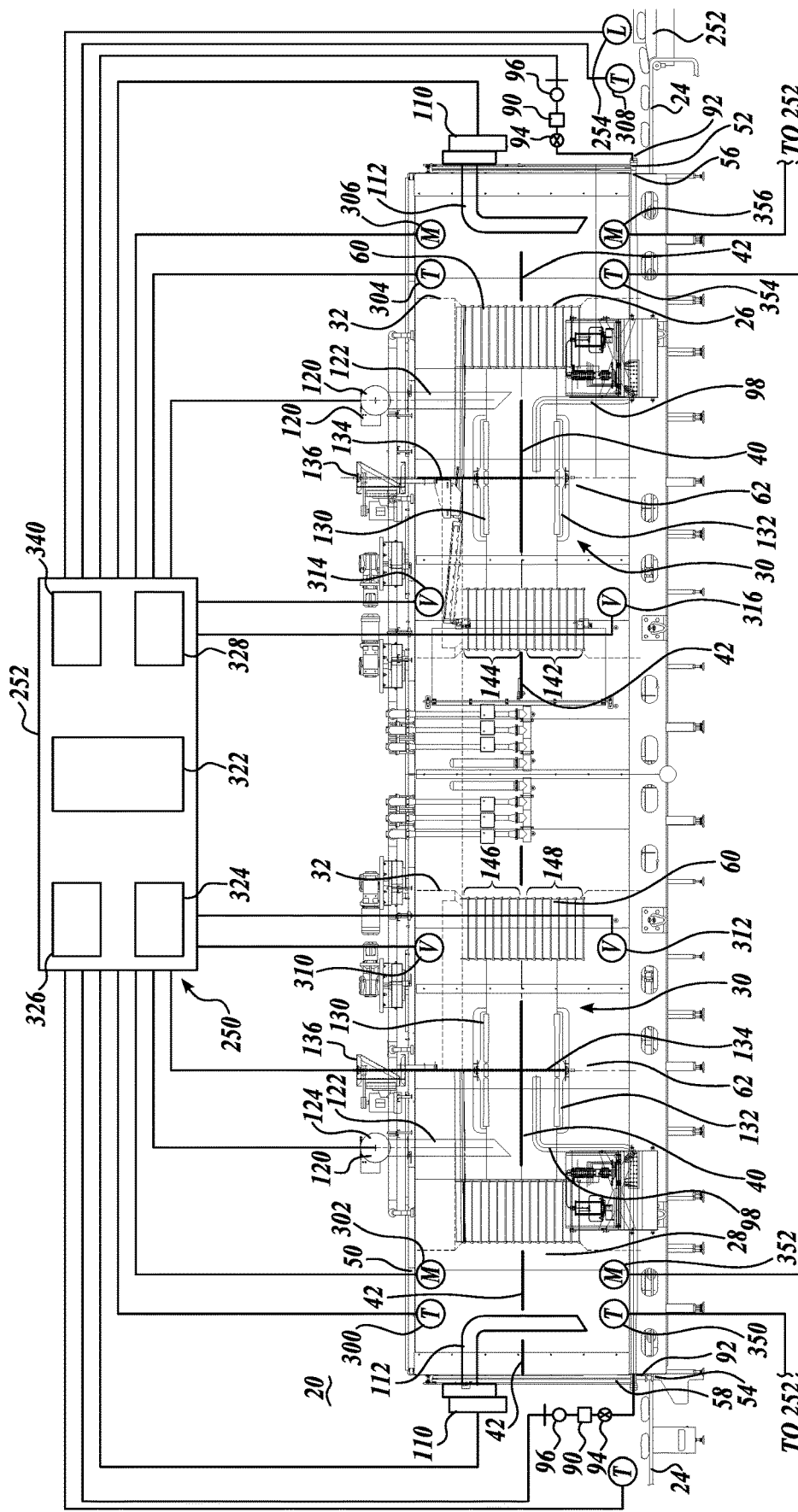
FIG. 1 is a schematic elevational view of a thermal processing system utilizing a double spiral conveyor stack within a housing and a thermal processing medium circulation system, in accordance with one embodiment of the present disclosure.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "back," "upward," "downward," "right-hand," left-hand," "in," "out," "extended," "advanced," "retracted," "proximal," "distal," "central," etc. These references and other similar references in the present application are only to assist in helping describe and understand the present invention and are not intended to limit the present invention to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The term "about," "approximately," etc. means plus or minus 5% of the stated value.

In the present application and claims, references to food products are meant to include all manner of food products that are commonly cooked. Such food products may include meat, fish, poultry, pasta, bread dough, pizza dough, or other types of dough or other types of foods.

The present application and claims in part relate to killing or eliminating pathogenic microorganisms that may be present on and/or in food products. The application also describes the killing of "bacteria" in and/or on food products. Such references to bacteria and pathogenic microorganisms relate to food pathogens, including, among others, the following: *E. coli, Salmonella* spp., *Clostridium botulinum, Staphylococcus aureus, Campylobacter jejuni, Yersinia enterocolitica* and *Yersinia pseudotuberculosis, Listeria monocytogenes, Vibrio cholerae* O1, *Vibrio cholerae* non-O1, *Vibrio parahaemolyticus* and other vibrios, *Vibrio vulnificus, Clostridium perfringens, Bacillus cereus, Aeromonas hydrophila* and other spp., *Plesiomonas shigelloides, Shigella* spp., miscellaneous enterics, and *Streptococcus*.

Embodiments of the present disclosure are directed to systems and methods for the thermal processing of work products, including food products FP. In the illustrated embodiment of FIGS. 1-3, the thermal processing of the food product is directed at an oven for cooking food products. In this regard, an oven system and apparatus 20 includes a spiral conveyor system 22 wherein the conveyor belt 24 is configured into an ascending spiral stack 26 connected to a descending spiral 28. A circulation system 30 delivers a gaseous cooking medium to food products FP or other workpieces disposed on the spiral stacks 26 and 28. The spiral stacks 26 and 28 are contained within an oven chamber 32, and the circulation system 30 circulates the cooking medium within the oven chamber. The conveyor belt 24 supports and transports workpieces/food products through the spiral stacks 26 and 28. A mezzanine assembly (including inner and outer mezzanines 40 and 42), as described in greater detail below, divides the spiral stacks 26 and 28 and the oven chamber 32 into a plurality of processing zones or segments.

A suitable gaseous cooking medium in accordance with embodiments of the present disclosure may be composed of steam, air, or a mixture of steam and air at a predefined operating temperature and flow velocity. Therefore, the terms "gaseous cooking medium", "cooking medium", "gas", "steam", "air", and "air/steam mixtures" or "saturated steam" may be used interchangeably throughout the present disclosure. However, it should be appreciated that other suitable gaseous cooking mediums besides air, steam, and air/steam mixtures are also within the scope of the disclosure, such as combustion gases.

Systems and methods described herein can be used to optimize the configuration of oven cooking zones and the flow of the cooking medium in the oven cooking zones. In that regard, specific cooking zone configurations may be suitable for different food types and for different cooking methods. These specific optimized configurations can be achieved by adjusting flow direction, temperature, humidity, velocity, and vector direction and magnitude inside the cooking zones. Suitable cooking methods for use with the system described herein may include, but are not limited to, 100% saturated steam cooking, high temperature cooking, low-temperature cooking, high-moisture cooking, roasting cooking, and sous vide cooking. Optimization of the cooking zones not only improves output product yield and profitability for the system, but also improves the quality of the output product.

A control system 250 is employed to control the operation of the system and apparatus 20 so that the food products FP or other work products are cooked or otherwise thermally processed to the desired level while at the same time killing a desired percentage of pathogenic microorganisms that may be present on the surface and/or in the interior of the food products. The control system 250 receives input from various measurement devices or instruments of a measuring system 252 that measures/monitors among other parameters the temperature and moisture levels within the oven chamber 32, the temperature of the food products FP entering the oven chamber, the speed of the conveyor 22, the level of loading of the food products on the conveyor, and the flow rate of the cooking medium circulating through the spiral stacks 26 and 28.

Figure 2:
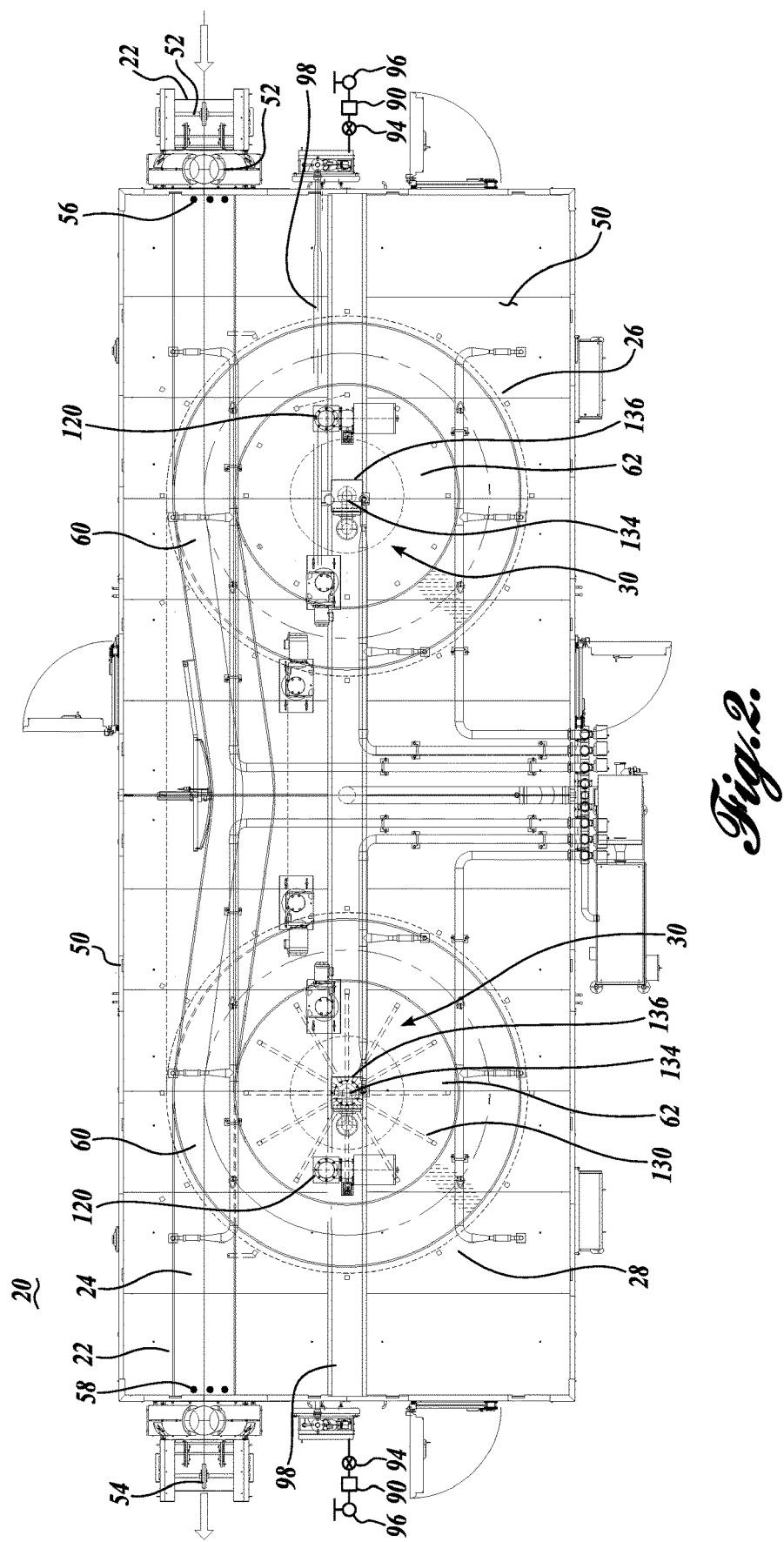
FIG. 2 is a top schematic view of FIG. 1.

Oven Housing Next describing thermal processing system 20 in greater detail, as shown in FIGS. 1-3, the oven chamber 32 includes an insulated housing 50 that can be of various constructions and shapes. For example, the housing 50 can be generally rectilinear or generally cylindrical in shape to accommodate the belt stacks 26 and 28, as well as the other components of system 20 located within the housing. The housing includes an inlet 52 located at the lower portion thereof (right-hand side in FIGS. 1 and 2) through which the conveyor belt 24 enters the housing, and an outlet 54 also in the lower portion of the housing (left-hand side in FIGS. 1 and 2) through which the conveyor belt 24 exits the housing. The elevation of the inlet 52 and outlet 54 can be of the same elevation in the housing 50.

An appropriate sealing mechanism can be utilized to retain the housing 50 substantially sealed from the exterior. Such sealing mechanisms may include, for example, an air or steam knife 56 adjacent housing inlet 52, as well as a second air knife 58 adjacent housing outlet 54. Of course, other types of sealing mechanisms may be utilized, for example, a curtain of flexible strips, constructed of a sheet material such as Teflon® plastic or fabric coated with Teflon®, that substantially blocks the openings at conveyor openings at inlet 52 and outlet 54, significantly reducing cooking gas medium leakages, and that are sufficiently flexible to conform to the shapes of the moving conveyor belt and food products FP being carried by the conveyor 22.

Of course, the plastic curtain construction may require periodic cleaning to help ensure that undesirable microorganisms do not lodge on the curtain.

As noted above, belt stacks 26 and 28 are located within the interior of housing 50, with the conveyor traveling in an ascending helical path entering the bottom of housing 50 through entrance 52 and then in a descending helical path before exiting the housing at a lower portion of the housing 50 through outlet 54 at substantially the same elevation as entrance 52. Although two belt stacks 26 and 28 are shown as positioned within the housing 50, the housing can be adapted to contain other numbers of belt stacks. Moreover, the conveyor belt 24 may be disposed in a different arrangement other than the helical belt stacks 26 and 28 shown in FIGS. 1-3. For example, an elevating chain conveyor may be employed as disclosed in U.S. Pat. Nos. 3,653,490, 4,627,530, and GB Patent No. 1038955, all incorporated herein by reference.

Conveyor Belt

Suitable embodiments of spiral stacking belts are shown and described in U.S. Pat. No. 3,938,651, issued to Alfred et al., and U.S. Pat. No. 5,803,232, issued to Frodeberg, the disclosures of which are hereby expressly incorporated by reference. However, it should be appreciated that other suitable spiral belt assemblies are also within the scope of the present disclosure.

Referring to FIGS. 1 and 3, when formed as spiral stacks 26 and 28, the pervious conveyor belt 24 (see the close-up perspective views in FIGS. 4A and 4B) is configured into a plurality of superimposed flights or tiers 60 that are stacked on top of each other (i.e., known in the art as "self-stacking" conveyor belts). In that regard, each tier 60 of the stacks 26 and 28 forms a pervious annulus, through which gaseous cooking medium may travel. When formed in spiral stacks 26 and 28, the plurality of tiers 60 creates an inner cylindrical channel 62, through which the heated gaseous medium may also travel. The food products FP travel on the conveyor belt 24 and are heated by gaseous cooking medium in the oven chamber 32. Exemplary spiral stacks 26 and 28 may have any number of tiers 60, typically in the range of about 8 to about 25 tiers.

Figure 4A:
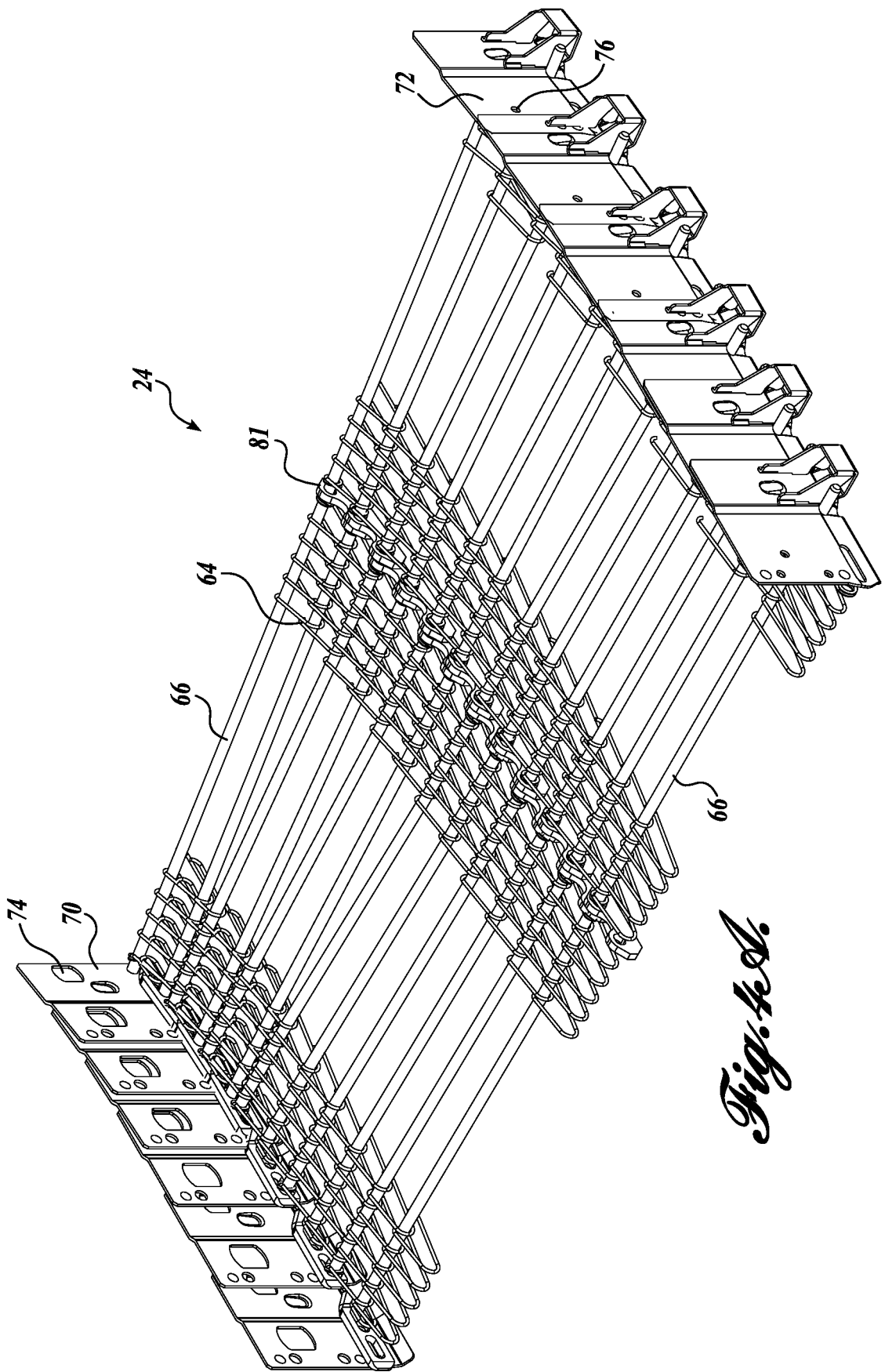
FIG. 4A is an enlarged fragmentary isometric view of a portion of a conveyor belt of FIGS. 1-3.
Figure 4B:
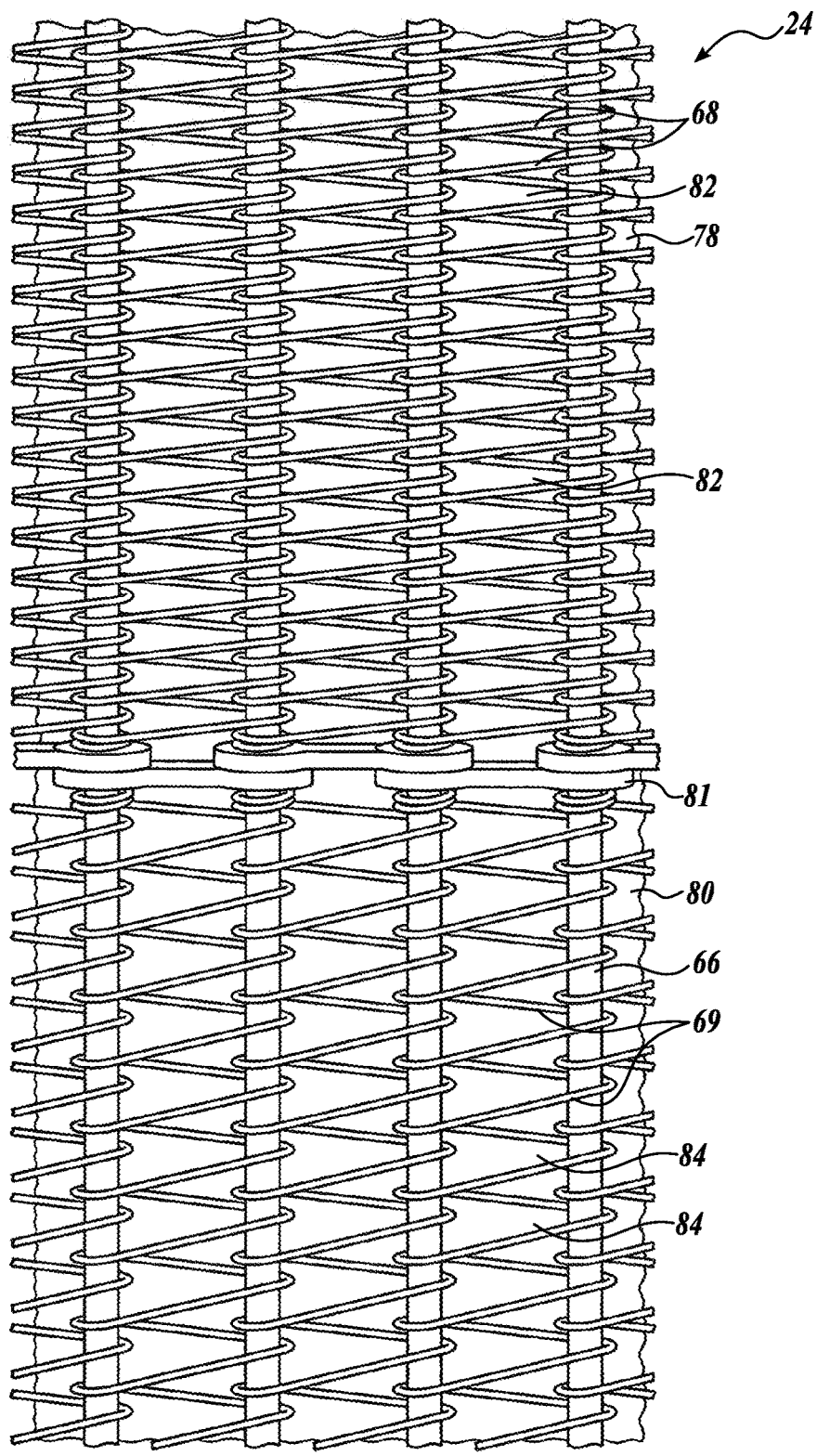
FIG. 4B is an isometric view of a portion of the conveyor belt of FIG. 4A.

Referring to FIGS. 4A AND 4B, the conveyor belt 24, in the form of a pervious belt mesh 64 for conveying food products FP, is formed by transverse rods 66 interconnected by intermediate links 68 and 69, as well as inner and outer links 70 and 72 at the ends of the transverse rods 66. The inner and outer links 70 and 72 are configured to enable spiral stacking for the belt tiers 60. When the conveyor belt 24 is configured as spiral stacks 26 and 28, the gaseous cooking medium may travel in a substantially vertical direction through the pervious belt mesh 64 of each superimposed tier 60.

As shown in FIGS. 4A and 4B, the conveyor belt 24 can be constructed as having variable weaving. In this regard, the conveyor belt may be woven to have variable sized openings when the belt is straight so that when an inward side of the belt is curved inward to form the spiral path, the openings on that side of the belt partially collapse and assume a smaller effective size that is about equal to the size of the openings in the outward side of the belt. Such variable weaving can be progressive to cause larger openings on a lateral inside side of the belt than the lateral outside side when the belt is straight.

FIGS. 4A and 4B illustrate one embodiment of a conveyor belt 24 having variable sized openings. The belt 24 has an outer portion 78 and an inner portion 80 joined together by a center link 81. The outer portion 78 includes a plurality of links 68 supported by rods 66. The links 68 are formed by weaving wire material around the support rods to form openings 82 therein. The inner portion 80 of the conveyor belt includes a plurality of links 69 also formed by weaving a wire material around the support rods 66 to form openings 84. Openings 84 are larger than openings 82 when the belt is straight.

In one embodiment, when the belt is straight, the pitch between adjacent links 69 may be about 12-15 mm, suitably about 13 mm, while the pitch between the links 68 may be about 7-11 mm, suitably about 9 mm. When the belt assumes a spiral configuration, the support rods along the inside of the conveyor move closer together, reducing the areal size of openings 84 to approximately the areal size of openings 82 in the outer portion of the conveyor belt. It will be appreciated that as a result, the airflow vertically through the spiral stacks 26 and 28 may be approximately equal across the width of the conveyor belt 24, thereby contributing to more equal thermal treatment of the food products FP being carried on the conveyor belt 24.

In addition to traveling vertically through the spiral stacks 26 and 28, as described below, the gaseous cooking medium flows in a substantially horizontal radial path (also called the "cross-flow" path) across the width of at least some of the tiers 60. The cross-flow path is channeled through the inner links 70 and possibly also the outer links 72 of the superimposed tiers 60. (See cross-flow, depicted by arrows 158 and 160 in FIG. 3; substantially vertical downward flow and upward and is depicted by arrows 154 and 156, respectively.) When the cross-flow component is flowing inwardly into the low pressure region, the differential pressure prevalent at lower elevations of the stacks 26 and 28 will tend to improve the condensation flow pattern through the applicable tiers 60 (see, e.g., FIG. 3).

As the self-stacking conveyor belt 24 transitions from a linear path to a stacked spiral or helical path upon entering the ascending spiral stack 26, the annular flow area through the inner links 70, toward the inner convection path 62 see FIGS. 1, 4A and 4B of the spiral stack 26, becomes constricted because the spacing between links 70 is collapsed as the belt 24 moves into a spiral or helical path. This inherent constriction is adjusted for using apertures 74 in the inner links 70 to define open areas for cross-flow of the thermal processing medium. As the spacing between the inner links 70 becomes constricted when the belt 24 moves in a spiral or helical path, through holes 76 in the outer links 72 are revealed. The holes 76 can be adjusted in size to achieve the desired cross-flow through the links 72. The apertures 74 and holes 76 in the respective inner and outer links 70 and 72 are designed to improve the balance flow and heat transfer uniformity between the inner and outer links 70 and 72, and, likewise, across the radial width of each tier or annulus 60 of the spiral stacks 26 and 28. Also, there are clearances between adjacent inner links 70 and against outer links 72 through which cross-flow of the thermal processing medium can also occur.

In one suitable embodiment, each inner link 70 includes an aperture 74 that is greater than about 10% of the total surface area of the inner link 70. In another embodiment, the inner link 70 includes an aperture 74 that is greater than about 20% of the total surface area of the inner link 70. In another embodiment, the inner link 70 includes an aperture 74 that is in the range of about 10% to about 50% of the total surface area of the inner link 70. In another embodiment, the inner link 70 includes an aperture 74 that is in the range of about 20% to about 50% of the total surface area of the inner link 70.

In one embodiment, the apertures 74 are substantially rectilinear in design, which enables the area of the apertures 74 on the inner links 70 to be increased to a larger size, as compared with, for example, circular apertures of diameters equal to the width of the rectilinear apertures 74.

The self-stacking spiral belt conveyor can optionally be substituted with use of a low tension spiral belt conveyor system. In a low tension conveyor belt system, the conveyor belt lays on top of rails that supports said flat low tension conveyor belt. Low tension spiral conveyors are normally wide open on the outside and are supported on the inside of the spiral laterally by a drum that the belt side flexes and wraps around. Helically formed stationary rails vertically support belt from below. To allow convection gas to pass from the belt stack toward or away from fans located in the central channel, the drums outer circumference which drives by friction against the inside edge of the belt is constructed as porous to allow substantial forced convection flow to flow through. The wide open outer circumference of the belt stack can be baffled as needed by a mezzanine or cylindrical collar sheeting to force more or less vertical flow through the porous low tension belt. To open up spaces in the central channel, the drum can be is supported by roller trunnions or slewing ring mechanical bearing elements, and the drum is rotatably powered via pinion gearing drive or other driving element on the an outer location on the drum circumference. Low tension spiral conveyor drums are usually driven with a tooth engagement via chain drive or fixed gearing between pinion and drum ring.

The convection gas movement described herein can function with use of the alternative low tension spiral conveyor system that is in wide use today and can be used instead of a self-stacking conveyor systems. There also is a spiral conveyor system called a GYRoSTACK™ which is an alternative to using either self-stacking or low tension conveyors. The GYRoSTACK™ conveyor can also be used with the dual convection flow path being taught herein. The GYRoSTACK™ is a hybrid with self-stacking happening on the inside and rail support similar to low tension conveying being done on the outside.

Improved flow uniformity across the width of the conveyor belt 24 within the spiral stacks 26 and 28 results in more even heat treatment to the workpieces to be one of the main contributing factors for lowering the standard deviation of temperatures within cooked products at the discharge of the oven, resulting in both improved product output yield and quality.

To illustrate the concept of standard deviation, assume that the targeted regulatory minimum cooking temperature for a specific food product is 160° F. A user will generally apply a safety margin to the target temperature to ensure that all workpieces exiting the system are fully cooked, with no under-cooked items exiting the system. A standard safety margin in the industry is three standard deviations, which is the temperature deviation between food products across the belt width. Standard deviations also depend on the workpiece type and the preferred operating conditions for the system. If each standard deviation is, for example, 5° F., then the processor will generally operate the system at 175° F. (i.e., 160° F.+3*5° F.=175° F.). If the system design can be improved to reduce the standard deviation from 5° F. to, for example, 3° F., the user can operate the system 20 at 169° F. (i.e., 160° F.+3*3° F.=169° F.), a reduction of 6° F. in the final food product temperature.

A reduction in the final food product temperature has several benefits. First, the dwell time of a food product in the system 20 to arrive at the specified temperature can be reduced, resulting in an increase in product yield. Second, there is a reduction in "over-cooking" of some of the workpieces exiting the system in order to ensure that all food products reach the final temperature specification. Third, there is less variation in the cooking results for similar food products placed in different locations along the belt width. Fourth, a faster rate of cooking improves retention of water, fat or both in the food product to increase the cooked product yield when configured with high temperature heat source and used in a roasting oven.

Thermal Processing Medium

As noted above, the thermal processor of the present disclosure is operable as an oven system, for example, oven system 20, shown and described herein. A desired cooking environment is created in the oven chamber 32 by at least one source of heated cooking medium. The cooking medium may be steam or heated air, either alone or in combination. The cooking medium may be supplied to the chamber 32 at a desired temperature, for example, in the range of anywhere from 140° F. to 500° F., depending upon the desirably of cooking the food product at a slower rate or a faster rate or a rate in between.

If steam is utilized as the cooking medium, steam generators 90 can be employed to introduce steam into the oven chamber 32 by steam inlet lines 92 connected to flow valves 94 and pressure regulator 96. As shown in FIGS. 1 and 3, the steam enters the oven housing 50 in the lower portion thereof and then is routed to a vertically central portion of the cylindrical channel 32 by a delivery tube 98 so as to discharge the steam into the fan region 62. The steam can be supplied to the oven chamber 32 at atmospheric pressure or at elevated pressure, in a super-heated condition. The steam can be supplied such that its outlet nozzle effect would add some work to the convection flow direction, thus in part adding supplemental convection flow to the fan movement.

If it is desired to utilize superheated saturated steam, whether 100% saturated or not, as a cooking medium, rather than externally generating the super-heated steam and then delivering the superheated steam to the interior of the oven chamber 32, an alternative is to supply steam (whether saturated or not) at atmospheric or superheated conditions from the steam generator (located within or without the oven housing 50 and then use a heater or heat exchanger located internally within the oven housing 50 to heat the steam to superheated conditions. In this regard, a heat exchanger, an electric or thermal fluid heater, or similar heating device may be positioned within the oven housing, thereby to elevate the temperature of the superheated steam anywhere in the temperature range from 212° F. to at least 500° F.

Alternatively, it may be desirable to process the food products at a temperature below 212° F. wherein the saturated steam in the chamber 32 will be less than 100% steam vapor. Instead, the cooking medium will consist in part of air. As the temperature of the saturated steam lowers below 212° F., the vapor portion becomes non-linearly lower, and the air component of the mixture becomes non-linearly higher. For example, at 150° F., saturated steam will consist of 25% moisture by volume and have a specific humidity of 0.172. At this lower moisture level, the condensing heat transfer rate of the cooking medium significantly lowers, which may be advantageously used to cook food products at a slower rate within the oven chamber 32. The rate of cooking can be controlled by the temperature of a cooking medium which, for saturated steam, is a function of the moisture content of the saturated steam.

As noted above, the cooking medium may be composed, in part or in whole, of heated air at a wide range of moisture levels or as dry air. Heated air may be supplied to the oven chamber 32 by various means, for example, a heater 110 located externally to the oven housing 50. The heated air from the air heater may be delivered to the interior of the housing by a delivery tube 112, which may route the heated air to a lower low pressure portion of the housing 50. By employing an exterior air heater 110, the air within the oven chamber 32 could instead be heated with a hot air pump (fan), which is an article of commerce. Also, the cooking medium, within the house 50 as discussed above, can be heated with a heating system located within the housing, in addition to or in lieu of using an external air heater.

To help regulate the temperature and/or humidity within the oven chamber 32, an ambient or fresh air supply source is provided for the system 20. In this regard, the end of a fresh/ambient air delivery tube 122 is positioned adjacent the inlet of circulation fans 130 and 132 described below. A fresh air inlet housing 120 is illustrated in FIGS. 1 and 3 as located above housing 50. A valve, 124 controlled by control system 250, is incorporated into the inlet housing, to control the flow of the fresh air into the oven chamber 32.

Although some of the components, as shown in the drawings, are positioned above the housing 50, such components instead can be placed at other alternative locations relative to the housing 50. Also, the fresh air delivery tube 122 is illustrated as extending substantially vertically downwardly from the fresh air inlet 120 to discharge the ambient/fresh air in the cylindrical channel 62 at an elevation intermediate the heights of the spiral stacks 26 and 28. However, it will be appreciated that the ambient/fresh air can be introduced into the oven chamber 32 at locations other than shown in the drawings and described above.

Also, rather than relying on the action of fans 130 and 132 to deliver fresh air into the oven chamber 32, an air pump can be used to force the fresh air down into the delivery tube 122, especially if the outlet of tube 122 is not in suction flow communication with fans 130 and 132, but is positioned at other locations in the oven chamber 32. It should be noted that heat sources such as for steam and high temperature air, also may be mounted in alternative locations and use other points of entry into housing 50 from that described above and shown in the drawings.

Thermal Processing Medium Circulation System

In addition to the temperature of the cooking medium, the dwell or cooking time of the food product can also be affected by not only the flow rate, but also the direction or flow of the cooking medium through the chamber 32, including through the spiral stacks 26 and 28. As noted above, numerous systems and methods have been employed to route the cooking medium through the cooking chamber in a desired direction(s) and velocities. In the present disclosure, the air circulation system 30 employs a pair of vertically spaced apart upper and lower fans 130 and 132 disposed within the cylindrical channel 62 of each of the spiral stacks 26 and 28, see FIGS. 1, 2, and 3. The fans 130 and 132 may be supported and powered by any convenient means.

Also, the fans can be of various, different configurations, for example, in the form of propellers as shown in FIGS. 1, 2 and 3. Other fan configurations may include blower wheels mounted on a common shaft. Also, blowers could be used that are based upon the principle of inducing a secondary low pressure flow with nozzle discharge coming from a high pressure flow. This is the manner in which Dyson® fans operate.

As a further alternative, air knives based on the principle of water blow-off application can be used. These air knives achieve high pressure, for example, 5 inches of water forced out through nozzles with exit geometry formed to induce large flow volumes. Such knives can utilize steam to create the air flow.

The fans 130 and 132 shown in FIGS. 1-3 can be individually supported and powered; also, the fans may be coupled to a common support and drive system as illustrated in FIGS. 1-3, wherein a common drive shaft 134 drops downwardly from the top of the housing 50. The upper end of the drive shaft 134 is powered by a drive system 136 located above housing 50. The drive shaft 134 may be extended downwardly or retracted upwardly so as to change the height or vertical positions of the fans 130 and 132 within the housing relative to the spiral stacks 26 and 28. Also, if desirable, the vertical spacing between the fans 130 and 132 can be altered by utilizing, for example, a drive shaft constructed from telescoping (or otherwise latitudinally relatively movable) segments that may be longitudinally adjustable or movable relative to each other.

If a common drive system is utilized for the fans 130 and 132, the fans are designed so that they move the thermal processing medium in opposite directions in the cylindrical channel 62. In this regard, the upper fan moves the cooking medium upwardly in the channel 62, and the lower fan moves the cooking medium downwardly in the central channel flow streams. Although it may be possible to reverse the direction of rotation of the fans 130 and 132, this may be challenging to accomplish due to the relatively large mass of the fans and the drive system.

A divider or central mezzanine 40 may be positioned between the upper and lower fans 130 and 132 so as to assist in the desired flow direction of the cooking medium, as described more fully below. The mezzanine 40 may be constructed and supported in manners well known to those skilled in the art. In this regard, the mezzanine may move vertically with the movement of the fans 130 and 132. Further, an outer mezzanine 42 may also encircle the outer circumferences of the spiral stacks 26 and 28, again to assist in achieving the desired flow direction of the cooking medium within the oven chamber 32. The construction of such exterior/outer mezzanines 42 are also known to those skilled in the art. Also, the inner and/or outer mezzanines can be movable up and down relative to the stacks 26 and 28, thereby to change the size of the different cooking medium regions created by the mezzanines.

It may be that the central mezzanine 40 is not needed. The two fans 130 and 132 located in the central channel 62 may operate sufficiently to direct the thermal fluid medium flow as desired without need for the mezzanine 40.

One flow pattern of the cooking medium within the oven chamber 32 is illustrated by various arrows shown in FIG. 3. As shown in FIG. 3, the upper and lower fans 130 and 132 force the cooking medium upwardly and downwardly, respectfully, within the cylindrical center channel 62 as depicted by arrows 150 and 152, respectively. The upwardly flowing fluid medium, upon reaching the top of the chamber 50, reverses direction to flow downwardly into and through an upper zone 138 of the spiral stack, as shown by arrows 154. Correspondingly, the cooking medium reaching the bottom of the central channel 62 reverses in direction to flow upwardly into and through a lower zone 140 of the annulus of the spiral stack as shown by arrows 156.

The cooking medium flowing downwardly through the upper zone 138 annulus the spiral stacks is drawn toward the central channel 62, which is at a lower pressure relative to the air pressure within the stacked annulus, due to the action of the fans 130 and 132. The lateral or horizontal flow of the cooking medium through the annulus of the stacks and to the central channel 62 is illustrated by arrows 158. Correspondingly, the flow of the cooking medium which initially flows upwardly through the lower zone 140 annulus of the spiral stacks merges with the downward medium flow 154 at the intersection of the upper and lower stack zones and turns inwardly relative to the spiral stacks and toward the center channel 62 of the spiral stacks, as shown by arrows 160.

As discussed above, appropriately sized openings or apertures 74 are formed in the conveyor belt inner links 70 to allow the cooking medium to flow back to the central cylindrical channel 32 which serves as the inlet for continuous recirculation of the cooking medium through the spiral stacks. It is noted that the cross-flow of the cooking medium through the openings 74 of the inner links 70 on all of the tiers is based on the pressure differentials across the openings at the inner links. At any given time, the moving inner links positioned above or below the horizontal planes of the fan outlets will experience a neutral to slightly positive pressure with the flow direction vector towards the stack, whereas the inner links located elevationally between the upper and lower fans representing a pathway to the fan inlets will experience a flow direction vector that is negative with the flow direction away from the stack and toward the center of the central channel.

As noted above, the position of the fans 130 and 132 can be moved up and down within the cylindrical channel 62 to change the relative sizes of the zones 138 and 140 and thus the proportions of the residence times in the cooking medium upflow and downflow directions relative to the total residence time of the cooking process.

The desired elevation of the fans may depend on the temperature of the cooking medium that is selected for the food product. For example, at temperature settings substantially lower than a 100% steam atmosphere, it is likely set point temperatures are set further below 212° F. In this situation, a higher fan speed will be used because the time in the condensation phase will be shorter. Therefore, the fluid flow inlet boundaries (at the intersection of zones 138 and 140) in this case will be positioned at a lower elevation relative to a process that utilizes a higher saturated steam temperature. In this configuration, the condensation residence time will be shorter and will be exposed to upflow cooking medium complementing the lighter steam that is introduced at the bottom of the oven. The longer convection residence times will be exposed to the vertical downflow of the cooking medium through the stack. This flow pattern for the cooking medium optimizes the cooking environment to minimize the air temperature variability across the belt during the overall cooking process.

It will be appreciated that the food product FP experiences fluid/flow medium variation multiple times within the oven chamber 32 where the oven encloses a configuration of a two belt stack conveyor path. This helps achieve a more uniform cooking experience for the food products FP being carried by the conveyor 22 regardless of the position of the food products across the width of the conveyor. This occurs because the cooking medium is directed toward the upper surface and the lower surface of the food product in alternating fashion while traveling on the conveyor belt up the ascending spiral stack 26 and then down the descending spiral stack 28. Also, it will be appreciated that there is no waiting for the change in flow direction of the cooking medium to occur, which would be the case if a single fan were used and the change in flow is achieved by changing the rotational direction of the fan or if a valve system were used to change the flow direction of the cooking medium.

It will be appreciated that in some cooking situations, it may be desirable to reverse the flow direction of the cooking medium from that shown in FIG. 3. This could be accomplished by rotating the fans 130 and 132 in the opposite direction or changing the pitch directions of the fans so as to achieve a counter-flow direction from that shown in FIG. 3. Nonetheless, regardless of the flow direction of the cooking medium, a higher relative velocity of the cooking medium per area of the conveyor tier will pass by the food product position on the insides of the conveyor belt relative to the outside. This is desirable since the food product is more concentrated toward the inside at the conveyor tier.

As described above, the heated air component of the cooking medium may be supplied to the oven chamber 32 by a heater 110 shown as located exterior to the sides of the chamber. The heated air from the heater 110 is shown as delivered to the lower portion of the housing. It will be appreciated that the heater 110 could be positioned at other locations relative to the housing, for example, above the housing. In that situation, a delivery tube could deliver the heated air downwardly into the center channel 62 of the spiral stacks in a manner somewhat similar to the positioning of the fresh/ambient air delivery tube 122. The hot air delivery tube could be positioned at the inlet of the circulation fans 130 and 132, thereby to mix the heated air with the cooking medium already being circulated by the fans 130 and 132. If needed, the delivery tube can be insulated so as not to radiate heat toward the inside of the spiral stacks 26 and 28, but rather instead deliver maximum heat to the inlet of the circulation fans 130 and 132. Also, the delivery tube can be designed so that its exit raises and lowers with fans 130 and 132.

It will be appreciated that the multiple cooking zones 138 and 140 created by the dual fan system of the present disclosure can be adjusted to some extent by controlling the type of heat source used. It is well known that steam condensation is one of the more effective ways to rapidly transfer heat into food product surfaces where the surface temperature of the FP is below the dew point temperature of the atmosphere. In the twin belt stack configuration described above, there are two belt stacks 26 and 28, that create four thermal treatment zones 142, 144, 146, and 148 with individual convection paths as shown in FIG. 3 above. Within this four-zone example three of the zones (144, 146, and 148) may be populated with a high temperature heat source and steam supply suitable for having a desired set humidity.

The incoming conveyor belt 24 going to the first zone 142, where the incoming food product is much cooler than dew point temperature, can give entering food product more rapid heating by steam condensation on to food product surfaces. In this first heating zone, the heat source can be by steam only, less having any high temperature heat source. Thus, in the first zone 142 heating can be primarily by steam, with high temperature heating being the main heating mode in the subsequent three zones (144, 146, and 148) that follow in the conveyor path. This would be done to match the optimal heat delivery required of the food product at its given point within the cooking process as it travels through convection zones arrayed along the helical conveyor paths 26 and 28 in the twin belt stack configuration example 20.

This combined effect of condensation followed by convection along the conveyor path is a faster and more efficient way to transfer heat into a food product. Faster cooking increases product yields. The disclosed spiral oven system with dual fans and two heating zones per conveyor stack creates a steam zone within a spiral oven within the first fan convection path in the dual fan configuration.

As shown in FIGS. 1, 2 and 3, the fan blades 130 and 132 occupy approximately 50% of the diameter of the central channel 62. It is to be understood that the fan blades may be sized to occupy either a larger or smaller percentage of the diameter of the cylindrical channel 62, depending on various factors, such as the desired flow patterns of the cooking medium, the desired flow rate of the cooking medium, as well as the desired rotational speeds of the fans, as well as geometric and other factors pertaining to the blades of the fans, including the angle of attack of the blades. Nonetheless, it is anticipated that in most situations, the diameter of the fans 130 and 132 will be approximately from 40 to 70% of the diameter of the cylindrical channel 62.

Moreover, although the fans 130 and 132 are shown as of substantially similar construction, but reversed in orientation relative to each other, it is to be understood that the fans can be designed so that either the upper or lower fan creates a larger or a smaller relative airflow even though the fans may be rotated at the same speed. This can be accomplished by the design of the fan blades themselves and/or the overall diameter of the fan blades. For example, it may be desirable to circulate more cooking medium in the upward direction to disperse steam that is collecting at the upper portions of the oven housing 50.

Although the velocity of the cooking medium through the oven housing 50 may be varied depending on the load level of the food product on the conveyor 22, and the desired cooking time of the food product, as well as other parameters, it is expected that the fans 130 and 132 will generate a fluid flow volume of from about 25,000 to 100,000 cfm, and that the corresponding cooking medium flow velocity will be from 200 to 1200 feet per minute.

Monitoring System

As noted above, oven system 20 includes a monitoring system 252 that monitors and measures the operational parameters of the system. Such monitoring or measuring includes the load frequency or density of the food product FP loaded onto the conveyor 22 from a delivery conveyor. Such loading monitor or sensor is schematically symbolized by the loading monitor/sensor 254, shown in FIG. 1. The loading monitor/sensor can take various forms, including the scale to weigh the food products being transferred to the conveyor 22. Alternatively, the loading monitor can be in the form of an optical scanner capable of scanning the food product FP and determining the volume of the food product, and then calculating the weight of the food product by using the known density of the food product. Such scanning systems are well known in the art. For example, see U.S. Pat. No. 7,452,466. The disclosure of this patent is incorporated herein by reference. Any information from the load monitor is transmitted to the control system 250.

The monitoring system 252 also measures the temperature and moisture levels within the oven chamber 32 as well as the velocity of the thermal processing (cooking) medium flowing through a chamber. These operational parameters are monitored by temperature sensors 300 and 304 located in the upper portions of the housing 50 as well as temperature sensors 350 and 354 located in the lower portions of the housing. A temperature sensor 308 is also positioned at the location of the loading monitor/sensor 254 to measure the temperature of the food products entering the housing 50 through inlet 52.

Moisture sensors 302 and 306 are located in the upper portion of the housing 50 as well as in the lower portions of the housing via moisture sensors 352 and 356. In addition, flow velocity sensors 310 and 314 are located above the stacks 26 and 28, with additional flow velocity sensors 312 and 316 located below the spiral stacks 26 and 28. These sensors are connected to the control system 250.

The temperature sensors can be configured to sense dry bulb and wet bulb temperatures within the oven chamber 32. The reason for also measuring the web bulb temperature is that as the food products are carried through the conveyor stacks 26 and 28, their surface temperature gradually increases. Eventually, the surface temperature will reach the dew point temperature of the moist hot air in the chamber 32. At that point, the moisture in the cooking medium within the chamber 32 will not condense on the surface of the food products. Instead, the moisture on the surface of the food products will begin to evaporate, which tends to cool the food product somewhat. The temperature at which this transition occurs will be the wet bulb temperature (dew point temperature). Nonetheless, the temperature of the food products must still be sufficient to treat the food products to the desired level as well as kill the desired level of pathogens on and/or in the food product. As an alternative, the monitoring system can measure the dry bulb temperature and humidity level in the oven chamber 32. From this information, it is possible to determine the wet bulb temperature, the relative humidity, and the dew point within the oven chamber.

The monitoring system 252 can utilize temperature sensors imbedded in the food products being treated to continually measure the temperature of the food products within the oven chamber. This could simplify or perhaps even eliminate the need for modeling the heat transfer to the food products, but of course modeling the kill level of pathogens occurring in the food products would still be required.

As noted above, the monitoring/measuring system 252 can be configured to also measure the initial temperature of the food products, such as by use of a temperature sensor 308 located at or downstream from the loading conveyor. This temperature sensor 308 can be an infrared sensor or may be of another type. Also, the temperature of the food products FP may be sensed at other locations along the thermal processing system.

It is to be understood on monitors and/sensors other than, in place of and/or in addition to those described above may be utilize with system 20. Also, such monitors and/or sensors may be located at positions other than or in addition to those descripted above.

Control System

As noted above, the system 20 includes a control system 250 to help insure that the food product FP is properly cooked and is pasteurized sufficiently to kill a desired percentage of the pathogenic microorganisms present on and/or in the food product. To this end, the various sensors and measurement devices and instrumentation discussed above are connected to the control system 250 by hard wiring, radio frequency, Bluetooth®, or other wireless transmission means, or otherwise so that the control system is aware of the loading level of food product on the conveyor 22, the speed of the conveyor 22, the temperature and moisture levels within the chamber 32, as well as the direction and velocity of the cooking medium circulating through the chamber 33. The control system 250 monitors these operational parameters of the system 20 to determine if such operational parameters are within the set points that have been predetermined for these operational parameters. When the operational parameters are within the set points, it has been predetermined that the thermal processing of the food product by system 20 is operating properly and that a desired percentage of pathogenic microorganisms present on and/or in the food product in question will be killed.

The control system 250 includes a processor 320 for use in controlling the system 20. The control system also includes a suitable controller 322, such as a programmable logic controller, linked to the processor and having an appropriate interface 324 for connecting the various gauges, monitors, and components of the thermal processing system to the logic controller 322. A memory unit 326 is provided for storing information regarding the thermal processing system, and a keyboard or other input device 328 is provided to enable the operator to communicate with the processor and logic controller. Also, a display or other output device 330 is provided to convey information from the processor or control system to the operator, including the functioning of the thermal processing system 20. An example of a processor-operated control system for controlling a pasteurization/thermal processing apparatus is disclosed by U.S. Pat. No. 6,410,066 and U.S. Patent Publication No. 2015/0010679, both of which are incorporated herein by reference.

The control system, more specifically the computer together with the controller 322, controls the various components and subsystems of the system 20, including the level of the loading of the food product onto the conveyor, by controlling the operation of the loading conveyor. The control system also controls the speed of the conveyor belt 24 by controlling the conveyor drive motor(s). In addition, the control system controls the temperature within the chamber 32 by controlling the temperature, moisture content, and speed/velocity of the cooking medium circulated through the chamber 32. The control system also monitors the loading sensor, the moisture sensors 302, 306, 352 and 356, the circulation or flow velocity sensors 310, 312, 314 and 316, as well as the various temperature sensors 300, 304, 350, 354, and 308. Thus, the control system is capable of controlling the system 20 and the thermal processing process performed by the system 20 to provide a desired cooking environment as well as achieve a targeted reduction in the pathogenic microorganisms present on and/or in the food product FP.

In the control system 250, the computer 320 may operate under a process control program to control the cooking or other thermal treatment process in accordance with, for example, the specific temperature and humidity profile within the chamber 32 which was determined empirically to achieve a desired level of cooking and also result in a desired microbial kill rate within a fixed period of time for a specific food product of a known species and known physical parameters, such as thickness. The process control program may be designed to predict the temperature of the food product as it changes over time and applies a time/temperature model. This model is not just the kill rate of the bacteria, but also a prediction of the temperature of the food, including the exterior temperature of the food. The models used will have been validated and confirmed to meet applicable food health and safety regulations, for example, the FDA's Hazard Analysis and Critical Control Points (HACCP) plans and principles, as well as USDA regulations. Of course, the validated model used herein will have to be specific to various factors, including: the type of food product; the thickness range of the food product; the initial temperature of the food product; in some instances, the fat content of the food product; the moisture content of the food product; the temperature of the cooking medium and/or the cooking chamber; the moisture level of the cooking medium and/or cooking chamber; the loading level of the food product on the conveyance system; etc. Also, the validation modes will have to include assumptions about the food product, for example, heat transfer coefficients, mass transfer out of the food product, and weight of the food as pasteurized, etc. Due to the inherent variability of food products, the temperature prediction will have a certain range, and a conservative approach will have to be taken, for example, a sufficiently long cooking time or a sufficiently high cooking temperature to compensate for the uncertainty. The approach may include a statistic analysis to determine pathogen kill based on the food product variables noted above, including, for example, thickness of the food product, fat content, and other composition of the food product, the initial temperature of the food product. As a consequence, some individual food products will require a longer cooking time and/or pasteurizing time than other specific food products. The statistic approach can be taken to determine the desired cooking time and/or pathogen kill of the least heated food product. The residence time within the oven fall short must meet regulatory requirements, for example as listed in Appendix A.

In addition, the control system may operate under a process deviation program that includes a real-time mathematical model that calculates the time and temperature required to achieve a desired cooking level and/or pathogen kill rate and undertakes process parameter changes if, for example, the temperature and/or humidity of the cooking medium within the chamber 32 deviates sufficiently from the set point range(s). The control program may utilize one or more proportional-integral-derivative (PID) controller algorithms which function to adjust one or more of the system parameters to seek to enable the system to still achieve a desired cooking level and/or microbial kill rate, even if one or more of the operational parameters of the cooking system are beyond their preselected set point(s). For example, if the monitoring system 252 indicates that the temperature within the chamber 32 deviates too far from the set point, the control system 250 can not only seek to bring the temperature within the chamber back to within the desired set point, but also could immediately decrease the speed of the conveyor 32 so that the food product FP dwell time in the chamber 32 is increased.

Moreover, if the control system 250 determines that the food product leaving the chamber 32 has not been sufficiently cooked and/or properly pasteurized, the control system could automatically activate a diverter system, not shown, to divert the affected food products from the conveyance system 22 so that such food products can be reprocessed to achieve the desired cooking level and/or microbial kill rate or used for another purpose.

Rather than automatically adjusting the operational parameters of the pasteurization system 20, the control system 250 may instead alert the operators to the deviation of the affected process parameter from the preset set point. The control system can, in addition, suggest adjustments to be made to the process parameters and/or operational settings of the components of the pasteurization system. Thereupon, the operator can make the indicated adjustments.

The control system 250 also may include a program that records the ongoing system 20 for future review and reference. Such a recordation program, as well as process control programs and process deviation programs, are disclosed in U.S. Pat. No. 6,410,066, incorporated herein by reference.

A process control program under which the controller system 250 operates may be designed to start the system 20 as well as thereafter control the system in order to maintain the process parameters at or near their predefined set points during the operation of the system 20. When starting the system 20, the user can prompt the control system, whereupon the control system will activate the conveyance system 22 so that the conveyor belt 24 operates at its predefined speed. The control system will also activate heaters 110/170/172 to raise the temperature in the chamber 32 to its predesigned set point. When the temperature within the chamber reaches the selected set point, as determined by the temperature sensors 300, 304, 350 and/or 354, the control system can activate the steam generators 90 used to supply steam to the chamber 32 via steam inlet lines 92 thereby to increase the moisture level of the cooking medium within the chamber 32. When the moisture level within the chamber 32 reaches the set point as determined by the humidity/moisture sensors 302, 352, 306 and 356, the computer can activate the infeed conveyor 22 in order to begin thermally treating of food products.

The control system may prompt the operator to enter the type and initial temperature of the food product to be processed and also request other information concerning the food product, as listed above. Alternatively, the control system may simply measure the initial temperature of the food product using temperature sensor 308. As the thermal treatment proceeds, the control system will monitor the process conditions of the system 20, and if necessary, adjust the various components of the system, such as the loading level of the food product onto the conveyor 22, the speed of the conveyor 22, the moisture level and temperature within the chamber 32, and the speed and position of the fans 130 and 132, in order to maintain the process conditions within the preselected set point ranges.

Alternative Embodiment

FIGS. 5 and 6 illustrate an alternative embodiment of the present disclosure wherein a high temperature heat source is utilized in conjunction with the oven system 20. In FIGS. 5 and 6, the components that are the same or comparable to the components shown in FIGS. 1-4B are identified by the same part number so as to avoid repetition in the description of the present disclosure.

FIGS. 5 and 6 illustrate a high temperature heat source incorporated into the convection gas flow pattern shown in FIG. 3. In this regard, external upper and lower gas burners 170-172 are mounted to the exterior of housing 50. Such burners are articles of commerce. A horizontal inflow pipe section 174 connects the upper burner 170 with a substantially circular upper heat exchanger 176 disposed within the center cylindrical channel 62 below the upper fan 130. To this end, a vertical connecting section 178 extends downwardly from the distal end of the inflow pipe section 174 to the heat exchanger 176. The heat exchanger 176 is formed with a substantially circular inner section 180 that extends approximately 330° of a circle in the clockwise direction shown in FIG. 6 and then reverses on itself to form the heat exchanger outer section 182 that is a larger diameter of the heat exchanger inner section and also is at a higher elevation than the heat exchanger inner section 180. The distal end of the heat exchanger outer section 182 is connected to an exhaust pipe 184 that extends upwardly through the top of the housing 50 to the ambient. Although not shown in FIG. 5, the exhaust from the heat exchanger 176 can be rerouted back to the inlet for the gas burner 170 and reused.

A lower heat exchanger 190 corresponding to the upper heat exchanger 176 is located in the lower portion of the oven housing 50. In this regard, a horizontal inflow pipe section 192 extends inwardly into the oven housing 50 from gas burner 172 to the lower heat exchanger 190. The distal end of the inflow pipe section 192 is connected to the heat exchanger 190 by an upwardly directed connection section 194 that corresponds to connection section 178 discussed above. As in the heat exchanger 176, the heat exchanger 190 includes an upper smaller diameter substantially circular section that extends substantially around the entire circumference of the inner cylindrical channel 162 in the manner of the inner heat exchanger section 180 discussed above. The inner heat exchanger section 196 is folded back on itself to form an outer heat exchanger section 198 that is also at a lower elevation than the inner heat exchanger section 196. The outer heat exchanger section 198 is in fluid flow communication with an exhaust pipe 200 which extends upwardly to an elevation above the top of the oven housing 50. As with the heat exchanger 176, the exhaust pipe 200 could be connected to the inlet of the gas burner 172 to reheat and recirculate the hot gas generated by the gas burner 172.

It will be appreciated that by the foregoing construction and location of the heat exchangers 176 and 190, the heat from the heat exchanger is mixed by the fans 130 and 132 before being supplied to the belt stacks 26 and 28 so as to create a more even heating medium temperature. Further, the returning heating medium from the belt stacks passes through the heat exchanger so that the heat from the heat exchanger does not adversely affect the food products positioned on the inside sections of the stacked tiers 60. Also, as shown in FIGS. 5 and 6, the heat exchangers 176 and 190 are spaced inwardly away from the inside of the stacks 26 and 28, thereby to keep the heat from the heat exchanger from extending outwardly to the stacks, but rather to force the heat from the heat exchanger toward the fans and then upwardly and downwardly along the central cylindrical channel 62.

As discussed above, the heating of the food products in the initial heating zone located at the lower section of the ascending spiral stack 26 may be primarily or substantially exclusively via condensation from the steam heating medium. In that situation, it may not be necessary to use a lower heat exchanger 190 with the stack 26. As noted above, a factor present with the present dual fan arrangement that helps create product cooking uniformity is having multiple cooking zones or segments, at least two zones or segments 138 and 140 in each belt stack. Each of the heat source inputs can be modulated individually to satisfy individual set point temperatures in each cooking zone based on sensing the temperature in each of the cooking zones. In the first cooking zone where product to be cooked enters the bottom of ascending spiral stack 26 at relatively low dew point temperature in relation to dew point temperature inside the chamber, heat transfers substantially entirely by steam condensation, increasing product temperature faster than is possible by high temperature convection heating. This first zone steam heating is attainable by having a dual cooking zone (upper and lower) belt stack even in a single belt stack oven configuration.

Convection gas (cooking medium) temperature tends to drop based on load level. In the present situation, the heating load is significantly reduced by virtue of applying convection into dual convection paths within a belt stack which improves heating recovery within the convection gas (cooking medium) as compared to prior systems with only one zone per belt stack. This improved heat recovery helps to keep cross-belt food product load inconsistency more in check based on having less temperature drop within the convection gas (cooking medium) flow stream as compared to prior systems with vertical flow in a single zone belt stack.

A majority of heat transfer is obtained from each heat exchanger array positioned in the center of the belt stack which lowers system time to react by being substantially local to the heat load demand. Temperature sensing is located much closer in proximity to the process, which means time function of the process control is improved. On reaction time, this is vital to food safety especially when large charges of cold product enter an oven idling in a heated condition and with just enough energy to satisfy the base load. Placing all of heat sources, fans and sensors in such close proximity with dual fan system per belt stack within a much shortened gas flow circuit inherently quickens load reaction time where burners go to high fire or control valves open sooner to satisfy the spike of load demand. These features all contribute to create low standard deviation of cooked product temperature.

While illustrative embodiments have been illustrated and described, it will be appreciated that various changes can be made therein without departing from the spirit and scope of the invention. In this regard, as noted above, the present disclosure can be applied to a cooling, drying, proofing or freezing system rather than to a cooking or roasting situation.

Also, although the present disclosure has focused on an oven system 20 utilizing dual spiral conveyor stacks, the present invention can be readily incorporated into a thermal processing system employing a single spiral conveyor stack. Certain thermal processing systems employ a single spiral conveyor stack, such as a cooking application composed of a deep fryer with an oven line. In this situation, the oven typically is composed of a single conveyor stack with a singular high-temperature source.

Also, the present invention may be incorporated into a spiral belt conveyor in addition to the types of spiral belt conveyors described herein. In this regard, the fans and also the heat source can be located within the center channel of the spiral conveyor(s).

Further, although in dual conveyor stack situations, four separate heating zones have been identified, in one of the spiral stacks a single fan (propeller) could be used, in which case the entire stack would constitute a single thermal treatment zone.

APPENDIX A

DRAFT COMPLIANCE GUIDELINES FOR READY-TO-EAT MEAT AND POULTRY PRODUCTS

On February 27, 2001, FSIS published a proposed rule "Performance Standards for the Production of Processed Meat and Poultry Products" (66 FR 12590). The proposed regulations include lethality and stabilization performance standards, *Listeria* testing requirements, and the rescission of requirements regarding trichina in pork products. To assist establishments in understanding these requirements, FSIS is issuing draft compliance guidelines. FSIS requests comment on these guidelines. These guidelines are based on previous Agency regulations, published scientific, challenge studies and other procedures validated to achieve the performance standards. Covered RTE products include cooked, fermented, salt-cured and dried meat and poultry products.

Except for thermally-processed, commercially-sterile products, the performance standards for lethality for all ready-to-eat (RTE) products require a 6.5 $\log_{10}$ reduction of *Salmonella* throughout finished meat products and a 7.0 $\log_{10}$ reduction of *Salmonella* throughout finished products that contain poultry. In addition, RTE fermented products that contain beef are required to have 5 $\log_{10}$ reduction of *E. coli* O157:H7 throughout. Except for thermally-processed, commercially-sterile products, the performance standards for stabilization require no growth of *Clostridium botulinum* and no more than 1 $\log_{10}$ growth *Clostridium perfringens* throughout all RTE meat and poultry products.

Compliance Guidelines For Meeting Lethality Performance Standards For Cooked Ready-to-eat Meat and Poultry Products With the 1999 final rule, "Performance Standards for the Production of Certain Meat and Poultry Products" (, 64 FR 732 ), applicable to cooked beef, roast beef, chunked and formed roasts, corned beef and poultry products, the Agency included compliance guidelines for lethality (Appendix A of the final rule). These compliance guidelines include times and temperatures to achieve a 6.5 $\log_{10}$ and 7.0 $\log_{10}$ reduction of *Salmonella* in meat products. For poultry products, an endpoint temperature for cooking to achieve a 7.0 $\log_{10}$ reduction of *Salmonella* is recommended. These same compliance tables could be used for all cooked RTE meat, including RTE cooked meat patties, because the proposed lethality performance standards are the same as those already in place for other RTE products.

Similarly, the compliance guidelines for stabilization performance standards found in Appendix B of the final rule, could also be used for compliance with the proposed RTE rule. These compliance guidelines will achieve the requirement of no growth of *Clostridium botulinum* and no more than 1 $\log_{10}$ growth *Clostridium perfringens*. The compliance guidelines in Appendix A and Appendix B of that rule are reproduced here.

GUIDELINES FOR COOKED MEAT PRODUCTS

1. Cooked beef, pork, lamb and other meat products can be prepared using one of the following time and temperature combinations to meet either a 6.5-$\log_{10}$ or 7-$\log_{10}$ reduction of *Salmonella*. The stated temperature is the minimum that must be achieved and maintained in all parts of each piece of meat for a least the stated time:

| Minimum Internal Temperature | | Minimum processing time in minutes or seconds after minimum temperature is reached | |
|---|---|---|---|
| Degrees Fahrenheit | Degrees Centigrade | 6.5-$\log_{10}$ Lethality | 7-$\log_{10}$ Lethality |
| 130 | 54.4 | 112 min. | 121 min. |
| 131 | 55.0 | 89 min. | 97 min. |
| 132 | 55.6 | 71 min. | 77 min. |
| 133 | 56.1 | 56 min. | 62 min. |

| Minimum Internal Temperature | | Minimum processing time in minutes or seconds after minimum temperature is reached | |
|---|---|---|---|
| Degrees Fahrenheit | Degrees Centigrade | 6.5-$\log_{10}$ Lethality | 7-$\log_{10}$ Lethality |
| 134 | 56.7 | 45 min. | 47 min. |
| 135 | 57.2 | 36 min. | 37 min. |
| 136 | 57.8 | 28 min. | 32 min. |
| 137 | 58.4 | 23 min. | 24 min. |
| 138 | 58.9 | 18 min. | 19 min. |
| 139 | 59.5 | 15 min. | 15 min. |
| 140 | 60.0 | 12 min. | 12 min. |
| 141 | 60.6 | 9 min. | 10 min. |
| 142 | 61.1 | 8 min. | 8 min. |
| 143 | 61.7 | 6 min. | 6 min. |
| 144 | 62.2 | 5 min. | 5 min. |
| 145 | 62.8 | 4 min.* | 4 min.* |
| 146 | 63.3 | 169 sec. | 182 sec. |
| 147 | 63.9 | 134 sec. | 144 sec. |
| 148 | 64.4 | 107 sec. | 115 sec. |
| 149 | 65.0 | 85 sec. | 91 sec. |
| 150 | 65.6 | 67 sec. | 72 sec. |
| 151 | 66.1 | 54 sec. | 58 sec. |
| 152 | 66.7 | 43 sec. | 46 sec. |

| Minimum Internal Temperature | | Minimum processing time in minutes or seconds after minimum temperature is reached | |
|---|---|---|---|
| Degrees Fahrenheit | Degrees Centigrade | 6.5-$\log_{10}$ Lethality | 7-$\log_{10}$ Lethality |
| 153 | 67.2 | 34 sec. | 37 sec. |
| 154 | 67.8 | 27 sec. | 29 sec. |
| 155 | 68.3 | 22 sec. | 23 sec. |
| 156 | 68.9 | 17 sec. | 19 sec. |
| 157 | 69.4 | 14 sec. | 15 sec. |
| 158 | 70.0 | 0 sec.** | 0 sec.** |
| 159 | 70.6 | 0 sec.** | 0 sec.** |
| 160 | 71.1 | 0 sec ** | 0 sec.** |

\* Past regulations have listed the minimum processing time for roast beef cooked to 145°F as "Instantly." However, due to their large size, most of these roasts dwell at 145°F, or even at higher temperatures, for at least 4 minutes after the minimum internal temperature is reached. FSIS has revised this time/temperature table to reflect this and emphasizes that, to better ensure compliance with the performance standard, establishments should ensure a dwell time of at least 4 minutes if 145°F is the minimum internal temperature employed.

\*\* The required lethalities are achieved instantly when the internal temperature of a cooked meat product reaches 158°F or above.

2. Cooked beef, including sectioned and formed roasts and chunked and formed roasts, and cooked corned beef should be moist cooked throughout the process or, in the case of roast beef or corned beef to be roasted, cooked as in paragraph (3) of this compliance guide. Moist cooking may be accomplished by: a) placing the meat in a sealed, moisture impermeable bag, removing the excess air, and cooking; b) completely immersing the meat, unbagged in water throughout the entire cooking process; or c) using a sealed oven or steam injection to raise the relative humidity above 90 percent throughout the cooking process.

3. Roast beef or corned beef to be roasted can be cooked by one of the following methods:

- Heating roasts of 10 pounds or more in an oven maintained at 250 °F (121 °C) or higher throughout a process achieving one of the time/temperature combinations in (1) above;

- Heating roasts of any size to a minimum internal temperature of 145 °F (62.8 °C) in an oven maintained at any temperature if the relative humidity of the oven is maintained either by continuously introducing steam for 50 percent of the cooking time or by use of a sealed oven for over 50 percent of the cooking time, or if the relative humidity of the oven is maintained at 90 percent or above for at least 25 percent of the total cooking time, but in no case less than 1 hour; or

- Heating roasts of any size in an oven maintained at any temperature that will satisfy the internal temperature and time combinations of the above chart of this compliance guide if the relative humidity of the oven is maintained at 90 percent or above for at least 25 percent of the total cooking time, but in no case less than 1 hour. The relative humidity may be achieved be use of steam injection or sealed ovens capable of producing and maintaining the required relative humidity.

4. Establishments should have sufficient monitoring equipment, including recording devices, to ensure that the time (accuracy assured within 1 minute), the temperature (accuracy assured within 1 °F), and relative humidity (accuracy assured within 5 percent) limits of these processes are being met. Data from the recording devices should be made available to FSIS program employees upon request.

The embodiments of the invention in which an exclusive property or privilege is claimed are defined as follows:

1. A thermal processing apparatus, comprising:
   (a) a thermal processing chamber having an inlet and an outlet;
   (b) a spiral conveyor configured in at least one upright spiral stack within the thermal processing chamber, the spiral stack defining a central channel relative to the stack around which the spiral stack travels, the conveyor entering the thermal processing chamber via the chamber inlet and exiting the thermal processing chamber via the chamber outlet;
   (c) a pair of spaced apart circulation fans both disposed within the central channel of the spiral stack, comprising an upper fan located within the central channel at an elevation below the top of the spiral stack and a lower fan located within the central channel at an elevation above the bottom of the spiral stack, the upper fan operating to direct thermal processing medium to flow upwards through and out the central channel and the lower fan operating to direct the thermal processing medium downwards through and out the central channel;
   (d) a thermal processing medium supply for discharging thermal processing medium into the thermal processing chamber at a location exterior of the spiral conveyor to direct flow of the thermal processing medium through the at least one spiral stack; and
   (e) the thermal processing chamber is configured to route the thermal processing medium flowing upwardly through and out the central channel of the spiral stack laterally across the top of the spiral conveyor and then directly back downwardly through the spiral stack across the entire width of the spiral stack without encountering a restriction to the flow of the thermal processing medium from an apparatus to thermally process the thermal processing medium, and to route the thermal processing medium flowing downwardly through and out the central channel of the spiral stack laterally across the bottom of the spiral conveyor and then directly back upwardly through the spiral stack across the entire width of the spiral stack without encountering a restriction to the flow of the thermal processing medium from an apparatus to thermally process the thermal processing medium, such that the thermal processing medium flowing downwardly through the spiral stack meets the thermal processing medium flowing upwardly through the spiral stack and causes said downwardly and upwardly flowing thermal processing medium to flow inwardly toward and into the central channel to complete upper and lower circulation paths of the thermal processing medium.

2. The thermal processing apparatus according to claim 1, wherein a distance separating the circulation fans can be varied.

3. The thermal processing apparatus according to claim 1, wherein the elevation of the circulation fans relative to the spiral stack can be adjusted.

4. The thermal processing apparatus according to claim 1, wherein the circulation fans comprise propellers.

5. The thermal processing apparatus according to claim 4, wherein the propellers of the upper fan have an opposite pitch to the propellers of the lower fan.

6. The thermal processing apparatus according to claim 4, wherein the circulation fans are coupled together.

7. The thermal processing apparatus according to claim 1, wherein the spiral conveyor is configured in at least two spiral stacks within the thermal processing chamber.

8. The thermal processing apparatus according to claim 1, wherein the thermal processing medium supply supplies saturated steam to the thermal processing chamber.

9. The thermal processing apparatus according to claim 1, wherein the thermal processing medium discharged by the thermal processing medium supply to the thermal processing chamber is heated air.

10. The thermal processing apparatus according to claim 9, wherein the heated air is supplied to an inlet of the circulation fans.

11. The thermal processing apparatus according to claim 1, wherein the thermal processing chamber is configured to direct the thermal processing medium flowing downwardly through the spiral stack toward the central channel at an intermediate elevation of the spiral stack and direct the thermal processing medium flowing upwardly through the spiral stack toward the central channel at an intermediate elevation of the spiral stack.

12. A thermal processing apparatus, comprising:
   (a) a thermal processing chamber having an inlet and an outlet;
   (b) a spiral conveyor configured in at least one upright spiral stack within the thermal processing chamber, the spiral stack defining a central channel relative to the stack around which the spiral stack travels, the conveyor entering the thermal processing chamber via the chamber inlet and exiting the thermal processing chamber via the chamber outlet;
   (c) a pair of spaced apart circulation fans both disposed within the central channel of the spiral stack, comprising an upper fan located at an elevation below the top of the spiral stack and a lower fan located at an elevation above the bottom of the spiral stack, the fans operating to direct thermal processing medium relative to the spiral stack, wherein the upper circulation fan directs the thermal processing medium to flow upwards through and out the central channel and the lower circulation fan directs the thermal processing medium downwards through and out the central channel;
   (d) a thermal processing medium supply for discharging thermal processing medium into the thermal processing chamber at a location exterior of the spiral conveyor to direct flow of the thermal processing medium through the at least one spiral stack; and
   (e) further comprising thermal processing medium flow direction means to route the thermal processing medium flowing upwardly through and out the central channel of the spiral stack and then laterally across the top of the spiral conveyor and then directly back downwardly through the spiral stack without any physical impediment to the flow of the thermal processing medium caused by an apparatus for thermally processing the thermal processing medium, and to route the thermal processing medium flowing downwardly through and out the central channel of the spiral stack and then laterally across the bottom of the spiral conveyor and then directly upwardly into and through the spiral stack without any physical impediment to the flow of the thermal processing medium caused by an apparatus for thermally processing the thermal processing medium, such that the thermal processing medium flowing downwardly through the spiral stack meets the thermal processing medium flowing upwardly through the spiral stack and causes said downwardly and upwardly flowing thermal processing medium to flow inwardly toward and into the central channel to complete upper and lower circulation paths of the thermal processing medium.

13. The thermal processing apparatus according to claim 12, wherein the flow direction means is configured to direct the thermal processing medium flowing downwardly through the spiral stack toward the central channel at an intermediate elevation of the spiral stack and direct the thermal processing medium flowing upwardly through the spiral stack toward the central channel at an intermediate elevation of the spiral stack.

14. The thermal processing apparatus according to claim 1, wherein the thermal processing medium is saturated steam, heated air or a combination of saturated steam and heated air.

15. The thermal processing apparatus according to claim 12, wherein the thermal processing medium is saturated steam, heated air or a combination of saturated steam and heated air.

16. The thermal processing apparatus according to claim 1, wherein the thermal processing medium flowing downwardly and upwardly through the spiral stack is delivered to the central channel at an elevation between the top and the bottom of the central channel.

17. The thermal processing apparatus according to claim 4, wherein the thermal processing medium is delivered to the central channel between the upper and lower fans.

18. The thermal processing apparatus according to claim 12, wherein the thermal processing medium flowing downwardly and upwardly through the spiral stack is delivered to the central channel at an elevation between the top and the bottom of the central channel.

19. The thermal processing apparatus according to claim 18, wherein the thermal processing medium is delivered to the central channel between the upper and lower fans.

* * * * *